US012695221B2

(12) United States Patent
Tamaki

(10) Patent No.: US 12,695,221 B2
(45) Date of Patent: Jul. 28, 2026

(54) ELECTRICAL CONNECTOR FOR FLAT CONDUCTOR

(71) Applicant: HIROSE ELECTRIC CO., LTD., Kanagawa (JP)

(72) Inventor: Shoichiro Tamaki, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 348 days.

(21) Appl. No.: 18/422,586

(22) Filed: Jan. 25, 2024

(65) Prior Publication Data

US 2024/0275087 A1 Aug. 15, 2024

(30) Foreign Application Priority Data

Feb. 10, 2023 (JP) ................................. 2023-018946

(51) Int. Cl.

*H01R 12/57* (2011.01)
*H01R 12/24* (2006.01)
*H01R 12/59* (2011.01)
*H01R 12/70* (2011.01)
*H01R 12/79* (2011.01)
*H01R 12/88* (2011.01)
*H01R 13/629* (2006.01)

(52) U.S. Cl.

CPC ....... *H01R 12/592* (2013.01); *H01R 12/7058* (2013.01); *H01R 12/88* (2013.01); *H01R 13/62927* (2013.01)

(58) Field of Classification Search

CPC .. H01R 12/57; H01R 12/592; H01R 12/7058; H01R 12/79; H01R 12/88; H01R 13/62927

See application file for complete search history.

(56) References Cited

U.S. PATENT DOCUMENTS

| | | | | |
|---|---|---|---|---|
| 6,551,128 | B2 * | 4/2003 | Asai | H01R 12/00 439/495 |
| 7,393,240 | B2 * | 7/2008 | Nishimatsu | H01R 12/88 439/495 |
| 10,868,374 | B2 * | 12/2020 | Mizusawa | H01R 12/774 |
| 12,388,208 | B2 * | 8/2025 | Ikeda | H01R 12/774 |

(Continued)

FOREIGN PATENT DOCUMENTS

JP 3762216 B2 4/2006

*Primary Examiner* — Abdullah A Riyami
*Assistant Examiner* — Thang H Nguyen
(74) *Attorney, Agent, or Firm* — RANKIN, HILL & CLARK LLP

(57) ABSTRACT

Provided is an electrical connector for flat conductor which includes: a housing, terminals, a slider, and a movable member, the slider is attached to the housing such that the slider is movable in the longitudinal direction between a retreat position and a forward position the movable member is attached to the housing such that the movable member is rotatable between an open position and a closed position, the movable member has a cam part, and a front-side pressing part of the cam part presses the slider toward a front side when the movable member rotates in a closing direction, a rear-side pressing part of the cam part presses the slider to a rear side when the movable member rotates in an opening direction, and a rotation center of the movable member is located in a range of the cam part in the longitudinal direction when viewed in the lateral direction.

5 Claims, 10 Drawing Sheets

(56) References Cited

U.S. PATENT DOCUMENTS

| | | | | |
|---|---|---|---|---|
| 2002/0081884 | A1* | 6/2002 | Asai | H01R 12/00 439/260 |
| 2004/0097118 | A1* | 5/2004 | Takashita | H01R 12/85 439/327 |
| 2007/0032115 | A1* | 2/2007 | Takashita | H01R 12/88 439/260 |
| 2007/0224848 | A1* | 9/2007 | Takashita | H01R 12/79 439/67 |
| 2008/0188111 | A1* | 8/2008 | Nishimatsu | H01R 12/79 439/312 |

* cited by examiner

ELECTRICAL CONNECTOR FOR FLAT CONDUCTOR

CROSS-REFERENCE TO RELATED APPLICATION

This application claims priority from Japanese Patent Application No. 2023-018946 filed with the Japan Patent Office on Feb. 10, 2023, the entire content of which is hereby incorporated by reference.

BACKGROUND

1. Technical Field

The present disclosure relates to an electrical connector for flat conductor.

2. Related Art

As an electrical connector for flat conductor, for example, as described in in Japanese Patent No. 3762216, there is known an electrical connector in which a flat conductor (flexible substrate) extending in the longitudinal direction is inserted and connected toward the front side. The electrical connector maintains a state in which the flat conductor is connected to the connector by a slider attached to a housing holding a plurality of terminals in an array. More specifically, the slider is attached to the housing from the rear side in a state in which the slider is movable in the longitudinal direction between a retreat position where the pull-out of the flat conductor is permitted and a forward position where the pull-out of the flat conductor is stopped. The slider has a pressing plate extending in a terminal array direction (the direction the same as the width direction of the flat conductor) on the front end side. When the slider is at a forward position, the pressing plate presses the flat conductor toward the contacting part of the terminal from above.

The electrical connector of Japanese Patent No. 3762216 is provided with "an operating lever (movable member) rotatable about the axis extending in the terminal array direction", and the slider interlocks in the longitudinal direction along with the rotation of the operating lever. The operating lever has an operating part extending in the terminal array direction and is operated by an operator and a rotatable arm extending from both ends of the operating part. The operating lever is rotatable between an open position where the slider is moved to the retreat position and a closed position where the slider is moved to the forward position about a pivot provided at the tip-end portion (free end) of the rotatable arm as the rotation center.

The operating lever has a cam part in the middle of the rotatable arm; the cam part is housed in the recess of the slider. The operating lever presses the front-end surface (front follower surface) or the rear-end surface (rear follower surface) of the recess with this cam part causes, and moves the slider in the longitudinal direction. More specifically, upon rotating the operating lever toward the closed position, the front cam surface of the cam part the front-end surface of the recess, and the slider moves to the forward position. On the other hand, upon rotating the operating lever toward the open position, the rear cam surface of the cam part presses the rear-end surface of the recess, and the slider moves to the retreat position.

SUMMARY

An electrical connector for flat conductor according to an embodiment of the present disclosure includes: a housing, a plurality of terminals, a slider, and a movable member, in which the housing is capable of inserting and pulling out a flat conductor in a longitudinal direction, the plurality of terminals is in an array in a lateral direction, and the plurality of terminals is held in the housing, the slider is attached to the housing such that the slider is movable in the longitudinal direction between a retreat position at which pull-out of the flat conductor is permitted and a forward position located on a front side from the retreat position, the forward position at which pull-out of the flat conductor is stopped, the movable member is attached to the housing such that the movable member is rotatable about an axis extending in the lateral direction between an open position forming an attitude having a predetermined angle to the longitudinal direction and a closed position forming an attitude along the longitudinal direction, the movable member has a cam part, and the cam part has a front-side pressing part and a rear-side pressing part, the front-side pressing part presses the slider toward a front side when the movable member rotates in a closing direction going to the closed position, the rear-side pressing part presses the slider to a rear side when the movable member rotates in an opening direction going to the open position, and a rotation center of the movable member is located in a range of the cam part in the longitudinal direction when viewed in the lateral direction.

DETAILED DESCRIPTION

Figure 1:
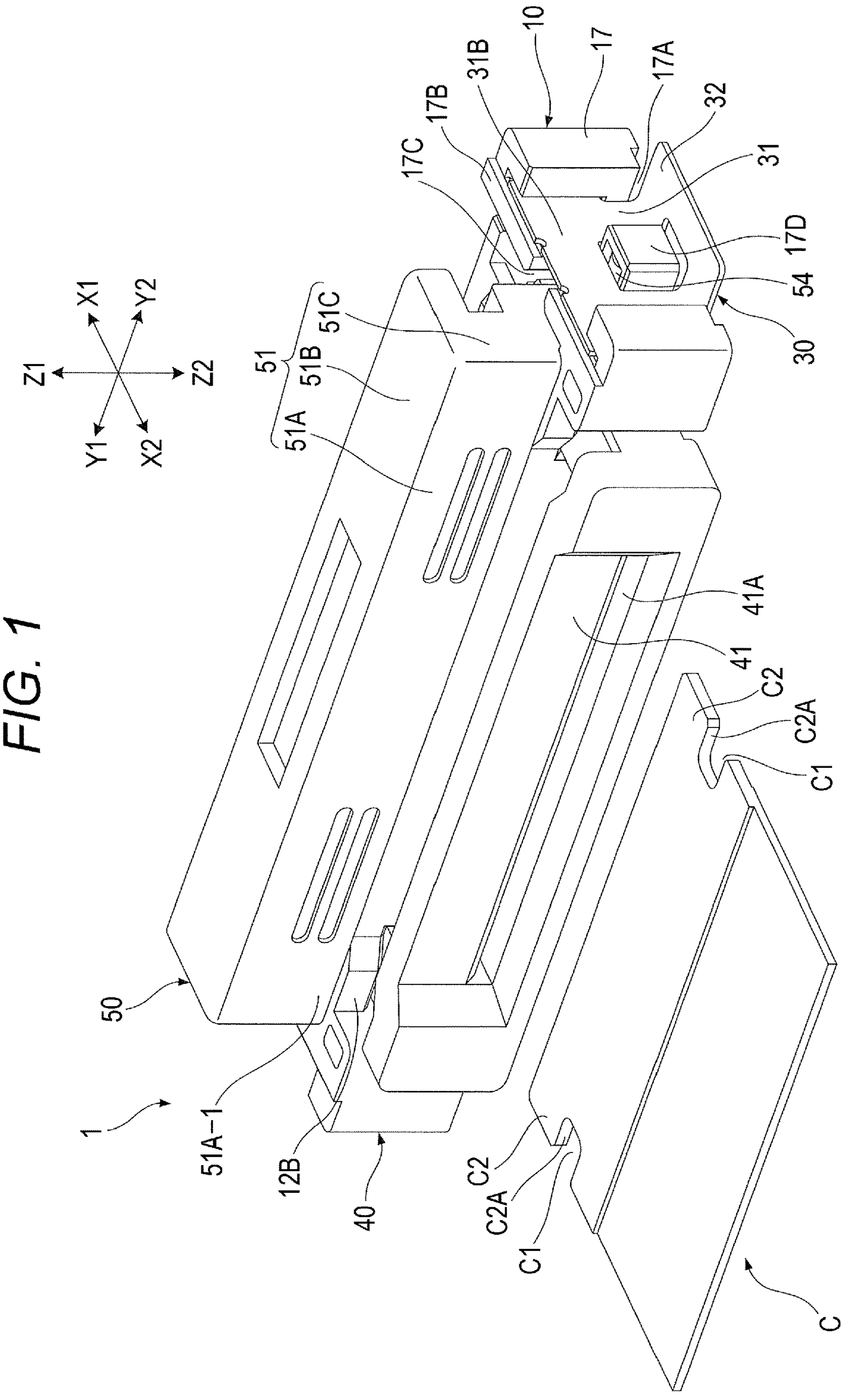
FIG. 1 is a perspective view showing an electrical connector for flat conductor according to an embodiment of the present disclosure along with a flat conductor, showing a state before the flat conductor is inserted.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a type of electrical connector in which a slider interlocks with an operating lever like Japanese Patent No. 3762216, the operating force of the operating lever to move the slider is preferably smaller. At this time, the smaller the ratio of the distance between the pivot and the cam surface to the distance between the operating part and the pivot becomes, the smaller the operating force of the operating lever becomes when the operating lever is viewed in the terminal array direction. Here, the term “cam surface” means the front cam surface in the case in which the operating lever is rotated toward the closed position, whereas the term means the open position in the case in which the operating lever is rotated toward the open position.

However, in Japanese Patent No. 3762216, the pivot is provided at the tip-end portion on the rotatable arm of the operating lever, and the cam part is provided in the middle. Therefore, when the operating lever is viewed in the terminal array direction at the point in time when the cam surface of the cam part presses the slider, the pivot and the cam surface are located at different positions without overlapping each other in the longitudinal direction. As a result, the distance between the pivot and the cam surface increases, and a problem arises in that the operating force of the operating lever increases correspondingly to a large ratio of the distance between the pivot and the cam surface to the distance from the operating part to the pivot.

In view of such circumstances, an object of the present disclosure is to provide an electrical connector for flat conductor capable of operating a movable member with a small operating force.

An electrical connector for flat conductor according to the present disclosure includes: a housing, a plurality of terminals, a slider, and a movable member, in which the housing is capable of inserting and pulling out a flat conductor in a longitudinal direction, the plurality of terminals is in an array in a lateral direction, and the plurality of terminals is held in the housing, the slider is attached to the housing such that the slider is movable in the longitudinal direction between a retreat position at which pull-out of the flat conductor is permitted and a forward position located on a front side from the retreat position, the forward position at which pull-out of the flat conductor is stopped, the movable member is attached to the housing such that the movable member is rotatable about an axis extending in the lateral direction between an open position forming an attitude having a predetermined angle to the longitudinal direction and a closed position forming an attitude along the longitudinal direction, the movable member has a cam part, and the cam part has a front-side pressing part and a rear-side pressing part, the front-side pressing part presses the slider toward a front side when the movable member rotates in a closing direction going to the closed position, the rear-side pressing part presses the slider to a rear side when the movable member rotates in an opening direction going to the open position, and a rotation center of the movable member is located in a range of the cam part in the longitudinal direction when viewed in the lateral direction.

In the present disclosure, since the rotation center of the movable member is located in the range of the cam part in the longitudinal direction when viewed in the lateral direction (the terminal array direction) even though the movable member is located at any position in the direction of opening and closing, the rotation center and the pressing part are located close to each other. Here, the term “pressing part” means the front-side pressing part in the case in which the movable member is rotated in the closing direction, whereas “the pressing part” means the rear-side pressing part in the case in which the movable member is rotated in the opening direction. Therefore, a ratio of the distance between the rotation center and the pressing part to the distance between the operating part and the rotation center is reduced correspondingly as the rotation center and the pressing part are located close to each other, and the distance between the rotation center and the pressing part is reduced. Therefore, it is possible to reduce the operating force necessary to move the movable member in the direction of opening and closing.

The electrical connector for flat conductor may further include a metal piece. In the electrical connector, the metal piece may be held in the housing, and the metal piece may have a shaft regulating part, the movable member may further have a shaft, the housing may further have a shaft support, the shaft may be provided such that the shaft includes the rotation center at a position corresponding to the metal piece in the lateral direction when viewed in the lateral direction, the shaft support may house the shaft, and the shaft support may regulate movement of the shaft to a front side, a rear side, and a lower side, the shaft regulating part may be located above the shaft, and the shaft regulating part may regulate movement of the shaft to an upper side.

According to such a configuration, it is possible to regulate the movement of the shaft of the movable member in the longitudinal direction and the vertical direction by the shaft support and the shaft regulating part, and thus it is possible to easily suppress the pull-out of the movable member from the housing.

The metal piece may be configured such that the metal piece further has a held part and a fixing part, the held part is attached to the housing from above, the fixing part is formed across a range including the shaft in the longitudinal direction, and the fixing part is fixed to a circuit board with solder.

As described above, the fixing part of the metal piece is provided in the range including the shaft in the longitudinal direction, and thus it is possible to increase a portion of the metal piece solder-fixed to the circuit board in the longitudinal direction. Accordingly, it is possible to fix the connector to the circuit board with a sufficient fixing strength.

The electrical connector may be configured such that the housing further has a motion stopper and a spring-biasing part, when the movable member is at the open position, the motion stopper contacts the movable member to stop movement of the movable member in the opening direction, and when the movable member is at the open position, the spring-biasing part spring-biases the slider at the retreat position toward the rear side, and presses the slider to the cam part from the front side.

In such a configuration, the movable member at the open position is supported by the motion stopper of the housing, and the movement in the opening direction is stopped. As a result, the slider is pressed to the cam part of the movable member by spring bias from the spring-biasing part of the housing, and the cam part is supported by the slider from the front side. That is, the movable member is in a state in which the movable member is supported at two positions when viewed in the lateral direction (the terminal array direction). As a result, the wobbling of the movable member is suppressed, and it is possible to excellently maintain the state in which the movable member is at the open position.

The electrical connector for flat conductor may be configured such that the housing further has a locking part, the slider further has a locked part, a locked arm, and a spring-biased part, the locking part is lockable to the locked part of the slider at the forward position from the rear side, the locked arm extends toward the front side, and the locked arm is elastically deformable, the locked part is formed on the locked arm, at least one of a rear portion of the locking part and a front portion of the locked part includes a surface having a component in a direction inclined to the longitudinal direction, the spring-biasing part is formed on the rear portion of the locking part, the spring-biased part is formed on the front portion of the locked part, and the spring-biasing part contacts the spring-biased part of the slider at the retreat position, and the spring-biasing part spring-biases the spring-biased part toward the rear side.

In such a configuration, at least one of the rear portion of the locking part of the housing and the front portion of the locked part of the slider contactable to each other includes a surface having a component in the direction inclined to the longitudinal direction. Therefore, when the slider is at the retreat position, it is possible to spring-bias the spring-biased part formed at the front portion of the locked part to the rear side by the spring-biasing part formed at the rear portion of the locking part using the elastic force of the locked arm. At this time, the spring-biased part presses the spring-biasing part to the front side by the component force of the elastic force of the locked arm. As a result, the spring-biased part is spring-biased to the rear side by the reaction force received from the spring-biasing part. The configuration, as a part of the locking part and a part of the locked part provided to lock the housing to the slider, the spring-biasing part and the spring-biased part are provided. Accordingly, since it is unnecessary to separately provide the spring-biasing part and the spring-biased part at positions different from the locking part and the locked part, and thus it is possible to avoid an increase in the size of the connector.

In the present disclosure, it is possible to provide an electrical connector for flat conductor capable of operating a movable member with a small operating force.

In the following, an embodiment of a present disclosure will be described according to the drawings. Note that in the drawings, components having equivalent functions are designated with the same reference signs, and the description is sometimes appropriately omitted. The terms such as "vertical" and "parallel" used in the present specification are not limited to their strict meanings and include the range in which similar functions are possibly expected.

Figure 2:
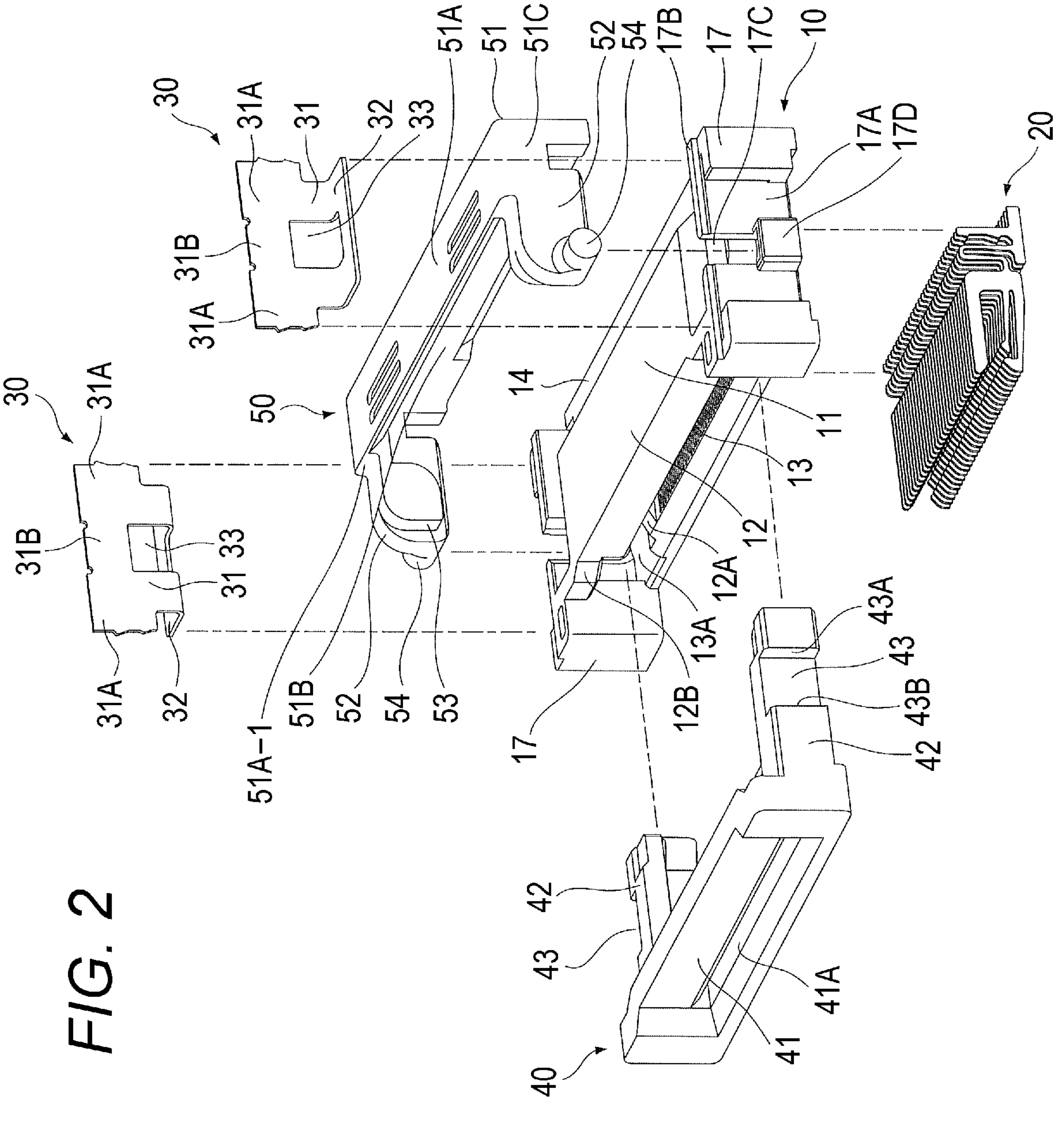
FIG. 2 is a perspective view showing the electrical connector for flat conductor shown in FIG. 1 with members separated.
Figure 3A:
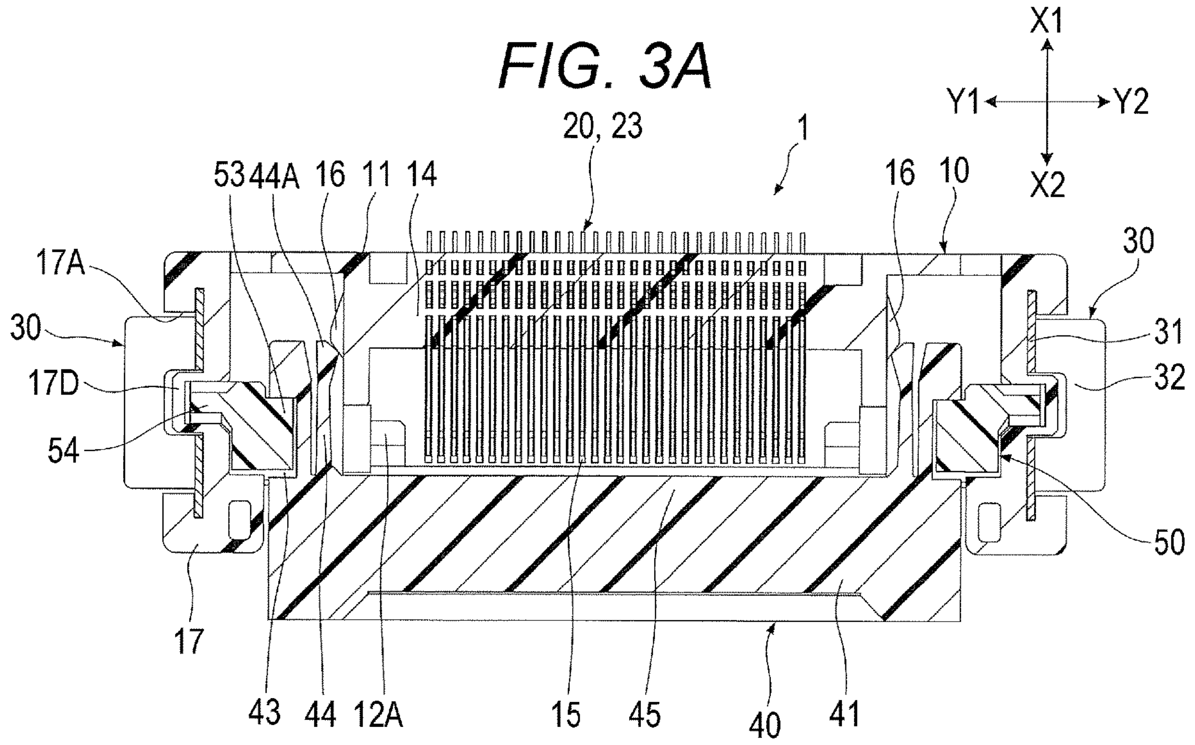
FIG. 3A is a diagram showing the cross-section of the electrical connector for flat conductor shown in FIG. 1 viewed from above.
Figure 3B:
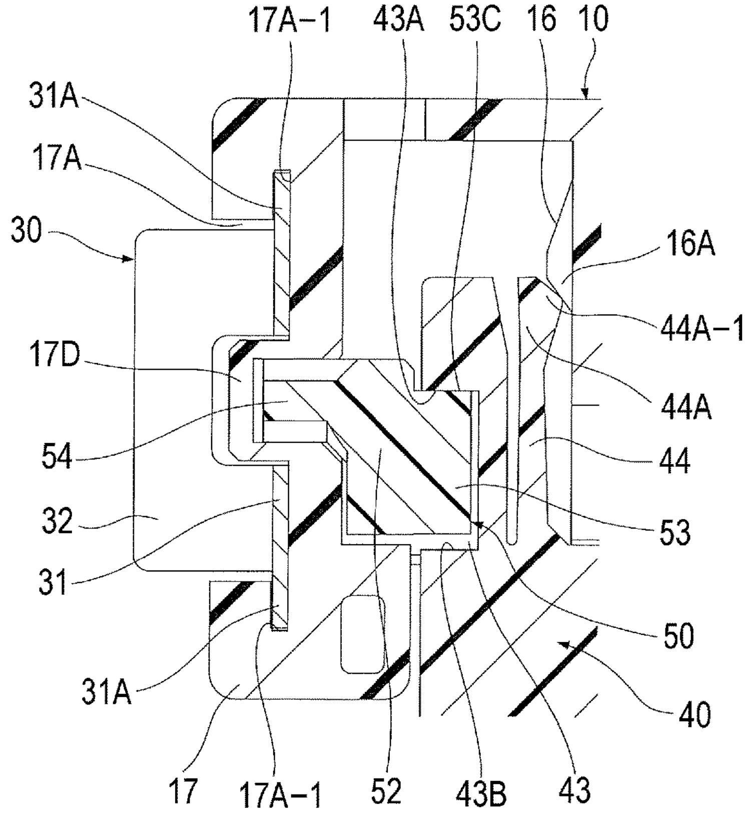
FIG. 3B is a partially enlarged diagram of the end portion of the electrical connector for flat conductor in FIG. 3A.
Figure 4A:
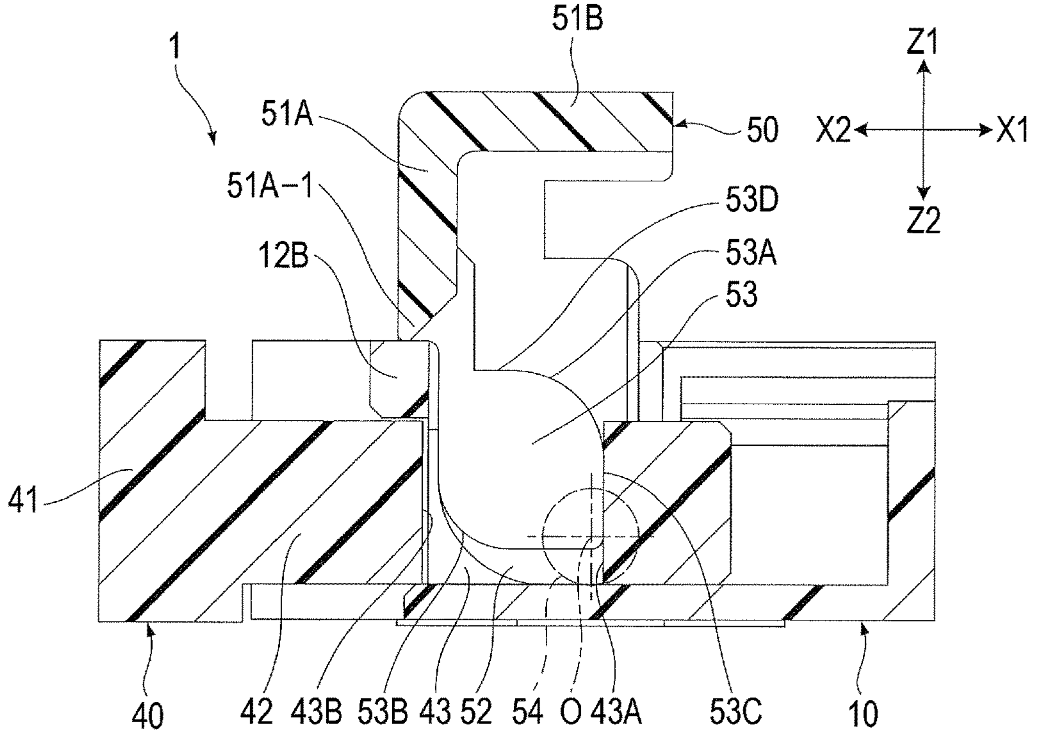
FIG. 4A is a longitudinal sectional view showing the electrical connector for flat conductor shown in FIG. 1, showing a cross-section at the position of the cam part in the connector width direction.
Figure 4B:
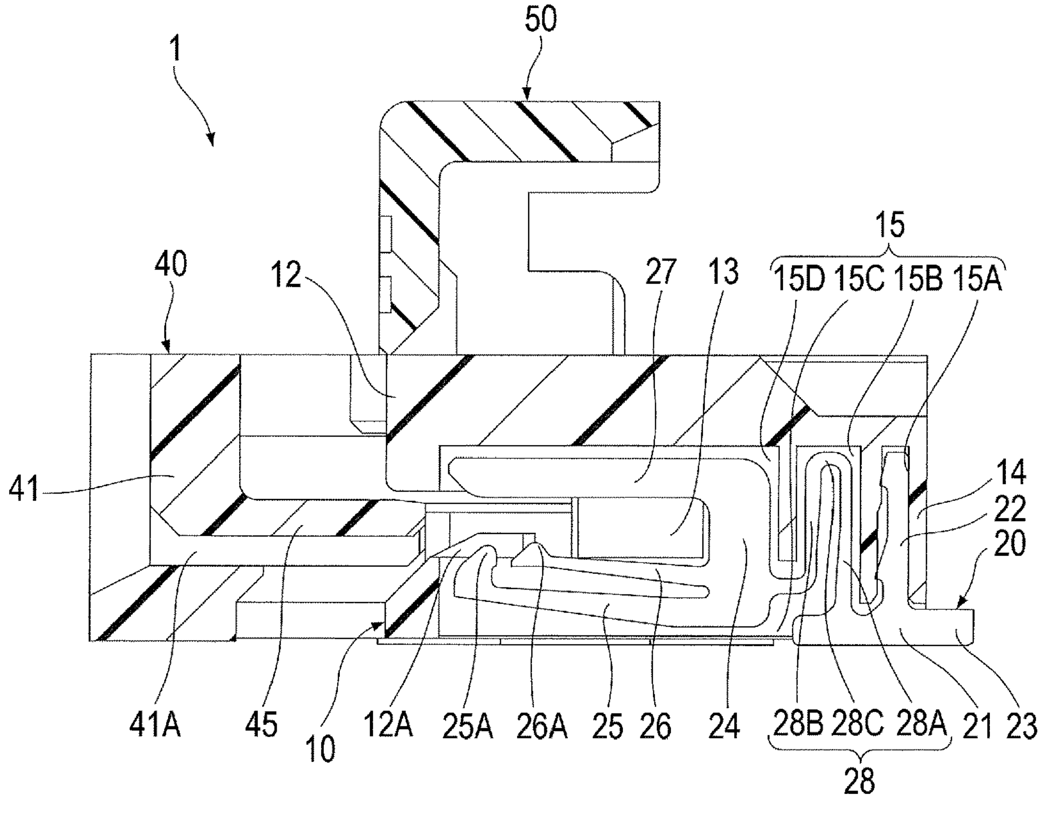
FIG. 4B is a longitudinal sectional view showing the electrical connector for flat conductor shown in FIG. 1, showing a cross-section at the position of the terminal in the connector width direction.

FIG. 1 is a perspective view showing an electrical connector for flat conductor according to the embodiment of the present disclosure (in the following, referred to as "a connector 1") along with a flat conductor C, showing a state before the flat conductor C is inserted. FIG. 2 is a perspective view showing a state in which the members of the connector 1 are separated. FIG. 3A is a longitudinal cross-sectional view showing the connector 1, and FIG. 3B is a partially enlarged diagram of the end portion of the connector 1 in FIG. 3A. FIG. 4A and FIG. 4B are longitudinal sectional views showing the connector 1. FIG. 4A shows a cross-section at the position of a cam part in a connector width direction. FIG. 4B shows a cross-section at the position of a terminal in the connector width direction.

The connector 1 is mounted on the mounting surface of a circuit board (not shown). The connector 1 is insertably and removably connected to the flat conductor C as a longitudinal direction (an X-axis direction) parallel to the mounting surface is the direction of insertion and removal. the connector 1 electrically conducts the circuit board to the flat conductor C by connecting the flat conductor C. The flat conductor C is a Flexible printed circuit (FPC), for example.

In the present embodiment, the X-axis direction is defined as a longitudinal direction, an X1 direction is defined as a front side, and an X2 direction is defined as a rear side. A Y-axis direction forming a right angle to the longitudinal direction (X-axis direction) in a plane (XY-plane) parallel to the mounting surface of the circuit board is defined as a connector width direction, and a Z-axis direction at a right angle to the mounting surface of the circuit board is defined as a vertical direction (a Z1 direction is defined as upward, and a Z2 direction is defined as downward).

The X1 direction is the direction of inserting the flat conductor C, and the X2 direction is the direction of removal of the flat conductor C. In the following description, the X-axis direction is referred to as the longitudinal direction, and the Y-axis direction is referred to as the connector width direction or the lateral direction.

The flat conductor C extends in the longitudinal direction (X-axis direction), and forms a flexible band shape as the connector width direction (Y-axis direction) is the width direction. On the flat conductor C, a plurality of circuit parts (not shown) extending in the longitudinal direction is formed in an array in the connector width direction. The circuit part is buried in the insulating layer of the flat conductor C except for the front-end side portion of the circuit part. The front-end side portion of the circuit part is alone exposed from the under surface of the flat conductor C, and the electrode pads and the like are formed.

The front-end side portion of the flat conductor C is formed with a notch C1 at both end portions in the width direction. The notch C1 is receivable of an anti-pull-out projection 12A of a housing 10 provided on the connector 1. The flat conductor C has a tab C2 on the front side of the notch C1, and the rear end of the tab C2 forms a catch C2A to which the anti-pull-out projection 12A is lockable from the front side.

As shown in FIG. 1, FIG. 4A, and FIG. 4B, the connector 1 has the housing 10 that receives the flat conductor C from the rear side, a plurality of terminals 20 arrayed in the connector width direction (Y-axis direction) as a terminal array direction and held in the housing 10, a reinforcement metal piece 30 disposed on the outer side of the terminal array range of the plurality of terminals 20 and held in the housing 10, a slider 40 attached to the housing 10 with being movable in the longitudinal direction, and a movable member 50 rotatable about an axis extending in the connector width direction.

The housing 10 is formed such that the flat conductor C is insertable and removable in the longitudinal direction (X-axis direction). In the present embodiment, the flat conductor C is inserted into the housing 10 toward the front side (the X1 direction), and pulled out of the housing 10 toward the rear side (the X2 direction). The plurality of terminals 20 is in an array in the lateral direction (Y-axis direction) and held in the housing 10.

Figure 9A:
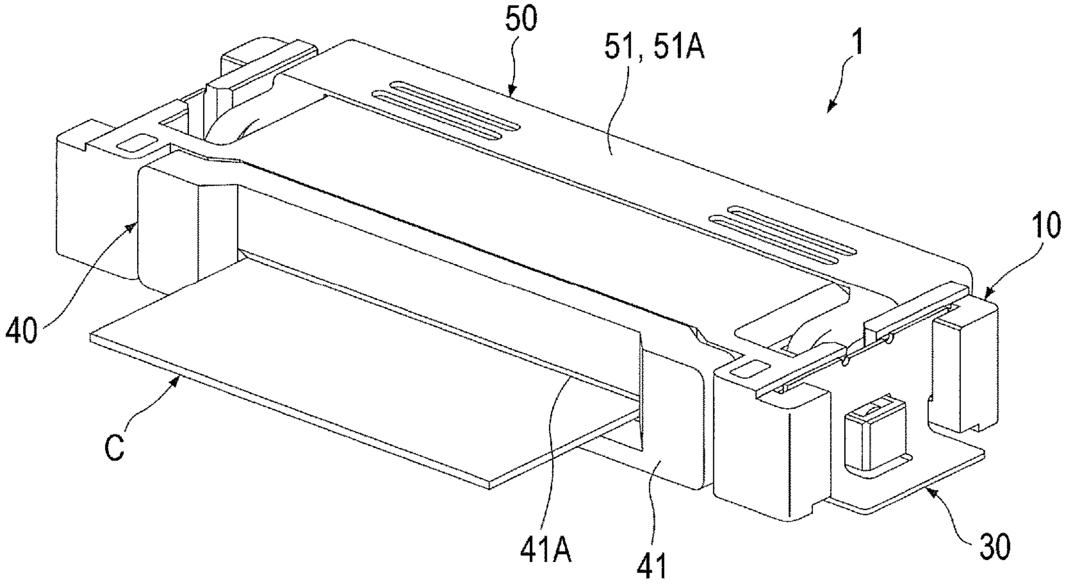
FIG. 9A is a perspective view showing the electrical connector for flat conductor in a state in which the flat conductor is inserted and then the movable member is moved to the closed position.

In the present embodiment, the movable member 50 is rotatable about an axis passing shafts 54 provided at both end portions in the connector width direction between "an open position (e.g. see FIG. 1) and a closed position (e.g. see FIG. 9A). In the following, the direction in which the movable member 50 rotates is referred to as "a direction of opening and closing". In the direction of opening and closing, the direction in which the movable member 50 rotates from the closed position to the open position is referred to as "an opening direction", and the direction in which the movable member 50 rotates from the open position to the closed position is referred to as "a closing direction."

The housing 10 is made of an electrically insulating material such as a resin. As shown in FIG. 2, the housing 10 has an appearance of a nearly rectangular parallelepiped as the connector width direction is the longitudinal direction. The housing 10 has a main body 11 and side walls 17 provided on both outer sides of the main body 11 in the connector width direction. The rear portion of the main body 11 is provided with a fitting part 12 into which a part of the slider 40 is fit. The fitting part 12 is formed with a receiving part 13 receivable of a part of the slider 40 and the front-end side portion of the flat conductor C from the rear side; the receiving part 13 is a space extending in the connector width direction and opening on the rear side. The front portion of the main body 11 is provided with a front wall 14 holding the terminals 20, extending in the connector width direction (also see FIG. 4B).

Receiving end portions 13A are both end portions of the receiving part 13 and house a side arm 42, described later, of the slider 40. In the present embodiment, the upper side inner wall surface and lower side inner wall surface of the receiving end portion 13A, i.e., the under surface of the upper wall of and the top surface of the lower wall of the fitting part 12 is formed with a groove extending in the longitudinal direction as a part of the receiving end portion 13A. In the receiving end portion 13A, this groove is guidable of the side arm 42 of the slider 40 in the longitudinal direction while regulating the movement in the connector width direction.

As shown in FIG. 2, the lower side inner wall surface of the receiving part 13, i.e., the top surface of the lower wall of the fitting part 12 is provided with the anti-pull-out projection 12A projecting upward between the terminal array range and the receiving end portion 13A in the connector width direction (also see FIG. 3A and FIG. 4B). The anti-pull-out projection 12A is a front-end surface forming a flat surface at a right angle to the longitudinal direction, and the anti-pull-out projection 12A is lockable to the catch C2A of the flat conductor C from the rear side (see FIG. 7B). As shown in FIG. 4B, the anti-pull-out projection 12A is formed as an inclined plane in which the top surface of the rear portion of the inclined plane is inclined upward as going toward the front side. The anti-pull-out projection 12A is guidable of the tab C2 of the flat conductor C inserted into the receiving part 13 to the front side using the inclined plane. On the other hand, the top surface of the front portion of the anti-pull-out projection 12A (in the following, referred to as "the top-end surface") is a flat surface at a right angle to the vertical direction.

As shown in FIG. 2, the rear end portion of the upper wall of the fitting part 12 is provided with a motion stopper 12B that stops the movement (rotation) of the movable member 50 in the opening direction at both ends positions in the connector width direction, more specifically, at the position right above the receiving end portion 13A. The motion stopper 12B extends in the connector width direction and is joined to the side wall 17. More specifically, as shown in FIG. 1 and FIG. 4A, the motion stopper 12B stops the rotation of the movable member 50 in the opening direction by supporting the movable member 50 at the open position from below.

As shown in FIG. 3A and FIG. 4B, the main body 11 is formed with a terminal housing part 15 that houses the terminal 20 in an array in the connector width direction. prior to the detailed description of the terminal housing part 15, first, the structure of the terminal 20 will be described. As shown in FIG. 2, the terminal 20 is formed by punching out a metal plate member in a plate thickness direction. As shown in FIG. 4B, the terminal 20 has a mounting part (a lower leg 21 and a held part 22, described later) and a connecting part 23 provided on one end side, a base arm 24, a lower side contact arm 25, an upper side contact arm 26, and a pressing arm 27 provided on the other end side, and an elastic part 28 provided between the mounting part and the base arm 24. In the following, in the case in which it is unnecessary to distinguish between the lower side contact arm 25 and the upper side contact arm 26, "the contact arms 25 and 26" are named generically for convenience of explanation.

As shown in FIG. 4B, the mounting part has the lower leg 21 extending in the longitudinal direction along the under surface of the front wall 14 of the housing 10 and the held part 22 extending upward from the front portion of the lower leg 21. The side edge portion of the held part 22 (the edge portion extending in the vertical direction) is formed with a plurality of protrusions to be press-fit and held on the front wall 14. The connecting part 23 extends from the front end of the lower leg 21 toward the front side and is located outside the housing 10. The connecting part 23 is solder-connected to the corresponding circuit part of the circuit board at its lower edge.

The base arm 24 extends in the vertical direction along the back surface of the front wall 14. The contact arms 25 and 26 extend to the rear side from the lower portion of the base arm 24 along the lower wall of the fitting part 12, and are elastically displaceable in the vertical direction. The rear end of the lower side contact arm 25 is formed with a rear side contacting part 25A projecting upward and located in the receiving part 13. The upper side contact arm 26 is provided above the lower side contact arm 25, and is formed shorter than the lower side contact arm 25. The rear end of the upper side contact arm 26 is formed with a front side contacting part 26A projecting upward on the front side from the rear side contacting part 25A and located in the receiving part 13. In the following, in the case in which it is unnecessary to distinguish between the rear side contacting part 25A and the front side contacting part 26A, "the contacting parts 25A and 26A" are named generically for convenience of explanation. The contact arms 25 and 26 are contactable to the circuit part of the flat conductor C from below using the contacting parts 25A and 26A with a contact pressure while elastically displacing downward.

The pressing arm 27 extends to almost the same position as the rear end of the lower side contact arm 25 from the upper portion of the base arm 24 toward the rear side along the upper wall of the fitting part 12. The pressing arm 27 is indirectly pressable to the flat conductor C from above toward the contacting parts 25A and 26A through a pressing plate part 45, described later, of the slider 40 (see FIG. 10B). In the present embodiment, the pressing arm 27 is formed thicker than the contact arms 25 and 26 in the vertical direction.

The elastic part 28 is formed in an inverted U-shape opened downward, and joins the lower leg 21 to the base arm 24. The elastic part 28 has a front leg 28A extending in the vertical direction on the front side, a rear leg 28B extending in the vertical direction on the rear side, and a bend part 28C bent downward and joining the upper-end portions of the front leg 28A and the rear leg 28B to each other. The front leg 28A is joined to the rear portion of the lower leg 21 at the lower end of the front leg 28A. The lower-end portion of the rear leg 28B is bent toward the rear side, and joined to the lower portion of the base arm 24. The elastic part 28 is elastically displaceable in any of the longitudinal direction, the connector width direction, and the vertical direction. In the present embodiment, the elastic part 28 is provided with the bend part 28C. Therefore, the entire length of the elastic part 28 is secured long, and it is possible to secure the elastic displacement amount in the elastic part 28, in turn, the terminal 20, without increasing the elastic part 28 in the bending direction of the bend part 28C, i.e., in the vertical direction.

Returning to the terminal housing part 15 of the housing 10, the terminal housing part 15 is formed as a groove in a slit shape spreading at the right angle to the connector width direction (Y-axis direction). As shown in FIG. 4B, the terminal housing part 15 has a front housing part 15A formed on the front wall 14, a middle housing part 15B and a lower housing part 15C, and a rear housing part 15D formed on the fitting part 12 and the front wall 14.

The front housing part 15A extends in the vertical direction at the front portion of the front wall 14, and is formed as a terminal holding part that houses, press fits, and holds the held part 22 of the terminal 20. The middle housing part 15B extends in the vertical direction at the rear portion of the front wall 14, and houses the elastic part 28. In a state in which the elastic part 28 is housed in the middle housing part 15B, a gap is formed between the elastic part 28 and the inner wall surface of the middle housing part 15B in the longitudinal direction, in the connector width direction, and in the vertical direction, and the elastic part 28 is elastically displaceable in these three directions. The lower portion of the middle housing part 15B is opened on the rear side, communicates with the rear housing part 15D, and houses the lower-end portion of the rear leg 28B of the elastic part 28.

The lower housing part 15C houses is formed penetrating in the longitudinal direction at the lower portion of the front wall 14, and houses the lower leg 21 of the terminal 20. The lower housing part 15C is opened in the vertical direction, and communicates with the front housing part 15A and the middle housing part 15B.

The rear housing part 15D extends along the lower wall and upper wall of the fitting part 12 and the front wall 14, and formed in a transverse U-shape opened on the rear side. The rear housing part 15D houses the contact arms 25 and 26 in a lower groove extending in the longitudinal direction along the lower wall of the fitting part 12, houses the pressing arm 27 extending in the longitudinal direction in an upper groove along the upper wall of the fitting part 12, and houses the base arm 24 extending in the vertical direction in a front groove along the front wall 14. As shown in FIG. 4B, the lower groove is opened upward and downward. On the other hand, although the upper groove is opened downward, the top end is closed.

The terminal 20 is attached to the terminal housing part 15 in such a shape from below and housed. More specifically, the terminal 20 is housed in the terminal housing part 15 and held on the housing 10 by press-fitting the held part 22 to the front housing part 15A from below. As shown in FIG. 4B, after the terminal 20 is attached to the housing 10, the contacting parts 25A and 26A of the terminal 20 project upward from the lower groove of the rear housing part 15D, and is located in the receiving part 13, and the lower-end portion of the pressing arm 27 projects downward from the upper groove of the rear housing part 15D, and is located in the receiving part 13.

As shown in FIG. 3A, the side surface of the front portion of the main body 11 is provided with a locking part 16 lockable on the slider 40 in the longitudinal direction. The locking part 16 projects outward from the side surface of the main body 11 in the connector width direction, and has a mountain shape in which the projecting amount is the largest in the middle of the longitudinal direction when viewed from above. The side surface (a surface parallel to the vertical direction) of the front portion of the locking part 16 is inclined outward in the connector width direction as going toward the rear side when viewed from above. The side surface of the rear portion of the locking part 16 is inclined outward in the connector width direction as going toward the front side when viewed from above.

Figure 9B:
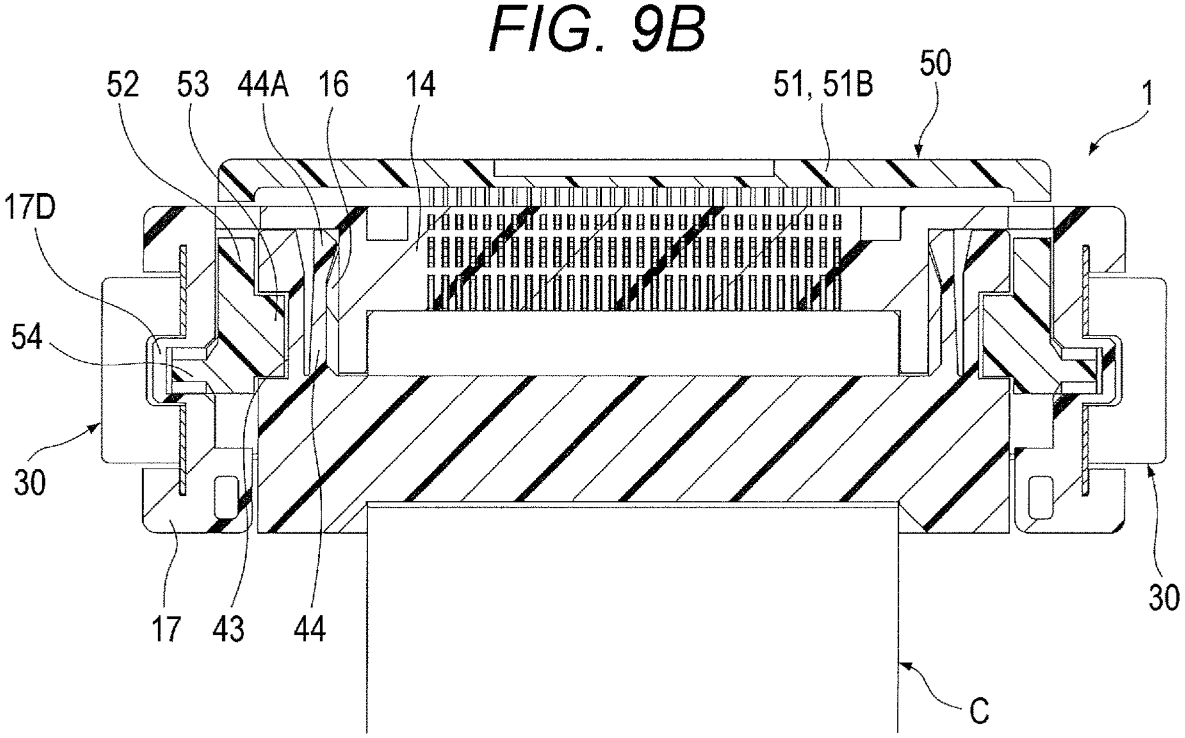
FIG. 9B is a longitudinal cross-sectional view showing the electrical connector for flat conductor in a state in which the flat conductor is inserted and then the movable member is moved to the closed position.

The front portion of the locking part 16 is lockable on a locked part 44A, described later, of the slider 40 at the forward position by contacting the locked part 44A from the rear side, and regulates the unexpected movement of the slider 40 to the rear side (see FIG. 9B). The rear portion of the locking part 16 is lockable on the locked part 44A of the slider 40 at the retreat position by contacting the locked part 44A from the front side, and regulates the unexpected movement of the slider 40 to the front side (see FIG. 3A, FIG. 3B, and FIG. 7B). In the present embodiment, as shown in FIG. 3A, the rear portion of the locking part 16 functions as a spring-biasing part 16A that spring-biases the locked part 44A of the slider 40 at the retreat position toward the rear side.

Figure 5A:
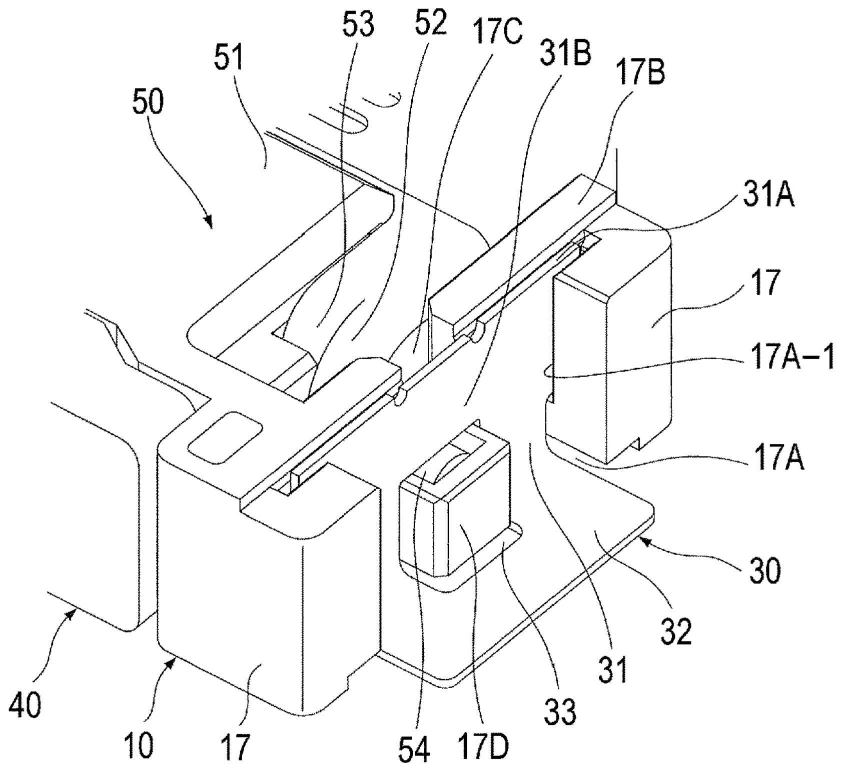
FIG. 5A is an enlarged perspective view showing the end portion of the electrical connector for flat conductor shown in FIG. 1, showing a state in which a reinforcement metal piece is attached.
Figure 5B:
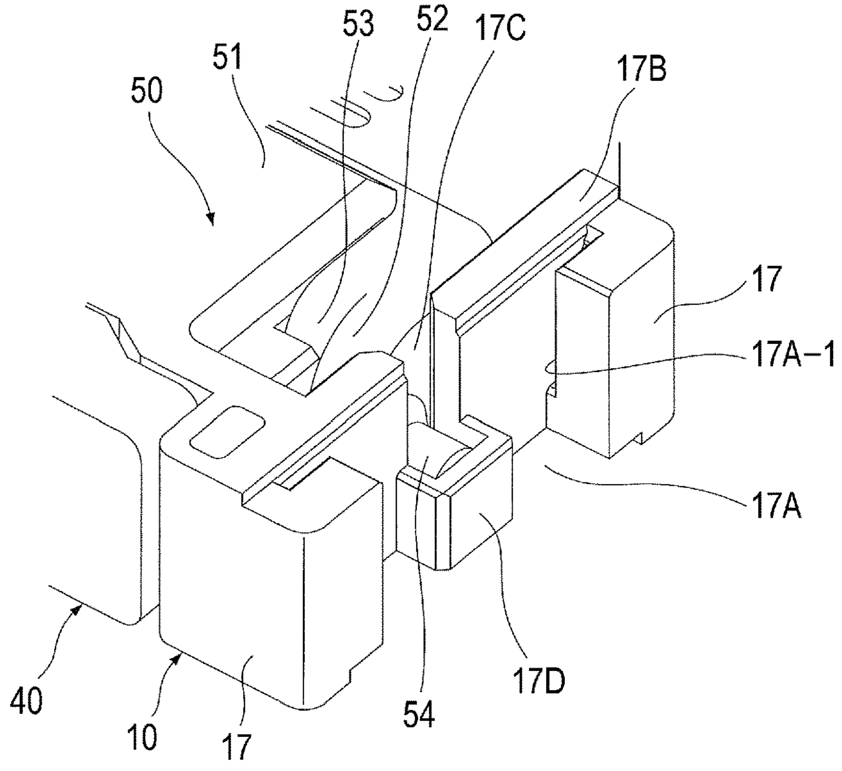
FIG. 5B is an enlarged perspective view showing the end portion of the electrical connector for flat conductor shown in FIG. 1, showing a state before the reinforcement metal piece is attached.

FIG. 5A and FIG. 5B are enlarged perspective views showing the end portion of the connector 1 in the connector width direction. FIG. 5A shows a state in which the reinforcement metal piece 30 is attached, and FIG. 5B shows a state before the reinforcement metal piece 30 is attached. As shown in FIG. 1, FIG. 2, FIG. 3A, FIG. 3B, FIG. 5A, and FIG. 5B, the side wall 17 of the housing 10 in the connector width direction is formed with a metal piece housing part 17A that houses and holds the reinforcement metal piece 30. The metal piece housing part 17A is formed as a recess that is put in the outer surface of the side wall 17 in the middle of the longitudinal direction of the side wall 17 and penetrates the side wall 17 in the vertical direction. As shown in FIG. 3B, FIG. 5A, and FIG. 5B, the metal piece housing part 17A has a metal piece holding part 17A-1 that press-fits and holds the reinforcement metal piece 30 at the front end portion and the rear end portion. The metal piece holding part 17A-1 is formed in a groove shape spreading at a right angle to the connector width direction and opened upward, and the metal piece holding part 17A-1 receives a press-fitting part 31A, described later, of the reinforcement metal piece 30 from above. The lower end of the metal piece holding part 17A-1 is closed.

As shown in FIG. 5A and FIG. 5B, the side wall 17 is formed with a side groove 17C on an inner wall 17B formed on the inner side from the metal piece housing part 17A in the connector width direction. The side groove 17C extends in the vertical direction from the center area of the inner wall 17B to the position of the inner wall 17B close to the lower end in the longitudinal direction, and penetrates the inner wall 17B in the connector width direction. The top end of the side groove 17C is opened, and the lower end is closed.

The lower portion of the side wall 17 is provided with a shaft support 17D that houses and rotatably supports the shaft 54 of the movable member 50. The shaft support 17D has a rectangular box shape projecting outward from the outer side surface of the lower portion of the inner wall 17B in the connector width direction in the center area of the longitudinal direction of the inner wall 17B. The shaft support 17D is located in the metal piece housing part 17A, and is provided in the range including the side groove 17C in the longitudinal direction. The shaft support 17D is opened to the inner side in the connector width, and communicates with the side groove 17C. The shaft support 17D is also opened upward, and receivable of the shaft 54 of the movable member 50 from above.

As shown in FIG. 1, FIG. 2, and FIG. 5A, the reinforcement metal piece 30 is formed such that a metal plate member is bent in the plate thickness direction. The reinforcement metal piece 30 has a held part 31 disposed as the connector width direction is the plate thickness direction, and a fixing part 32 bent at a right angle at the lower edge of the held part 31 and extending outward in the connector width direction. The reinforcement metal piece 30 is formed with a hole 33 in a rectangular hole shape penetrating the reinforcement metal piece 30 in the plate thickness direction in a region across both of the held part 31 and the fixing part 32 in the center area of the longitudinal direction. As shown in FIG. 5A, the hole 33 permits the entry of the shaft support 17D from below in a state in which the reinforcement metal piece 30 is attached to the housing 10 from above, and thus the interference of the reinforcement metal piece 30 with the shaft support 17D is avoided.

The held part 31 is disposed along the outer side surface of the inner wall 17B of the housing 10 (a surface located on the outer side in the connector width direction). the front end portion of and rear end portion of the held part 31 is formed as the press-fitting part 31A press-fit into the metal piece holding part 17A-1 of the housing 10 from above. The press-fitting part 31A is press-fit and held on the metal piece holding part 17A-1 by engaging a plurality of protrusions (see FIG. 2) with the inner wall surface of the metal piece holding part 17A-1 formed on the side edge portion of the press-fitting part 31A (the edge portion extending in the vertical direction).

In the upper portion of the held part 31 (a portion located above the hole 33), a part that extends in the longitudinal direction and joins two press-fitting parts 31A forms a shaft regulating part 31B. The shaft regulating part 31B is located in the range of the shaft support 17D and the shaft 54 in the connector width direction, and extends across the range including the shaft support 17D and the shaft 54 in the longitudinal direction. Therefore, the shaft regulating part 31B is contactable with the shaft 54 from above, and regulates the movement of the shaft 54 upward. As described above, the shaft regulating part 31B joins two press-fitting parts 31A in a double-supported beam shape. Thus, it is possible to firmly regulate the movement of the shaft 54 upward.

The fixing part 32 extends along the circuit board (not shown) at almost the same height of the bottom surface of the housing 10, and is fixed by solder-connection to the corresponding part of the circuit board. In the present embodiment, the fixing part 32 extends to the outer side of the metal piece housing part 17A in the connector width direction. The fixing part 32 is formed across the range including the shaft support 17D and the shaft 54 in the longitudinal direction. by providing the fixing part 32 in such a range, the portion solder-fixed to the circuit board in "the reinforcement metal piece 30 is formed large in the longitudinal direction. Therefore, it is possible to fix the connector 1 to the circuit board with a sufficient fixing strength.

The slider 40 is attached to the housing 10 between the retreat position (e.g. see FIG. 1, FIG. 3A, FIG. 3B, FIG. 4A, and FIG. 4B) and the forward position (e.g. see FIG. 9A, FIG. 9B, FIG. 10A, and FIG. 10B) in a movable state in the longitudinal direction, and fit into the housing 10 at the forward position. The retreat position is the position of the slider 40 that permits the pull-out of the flat conductor C. The forward position is the position of the slider 40 that stops the pull-out of the flat conductor C, and is located on the front side from the retreat position.

Figure 6A:
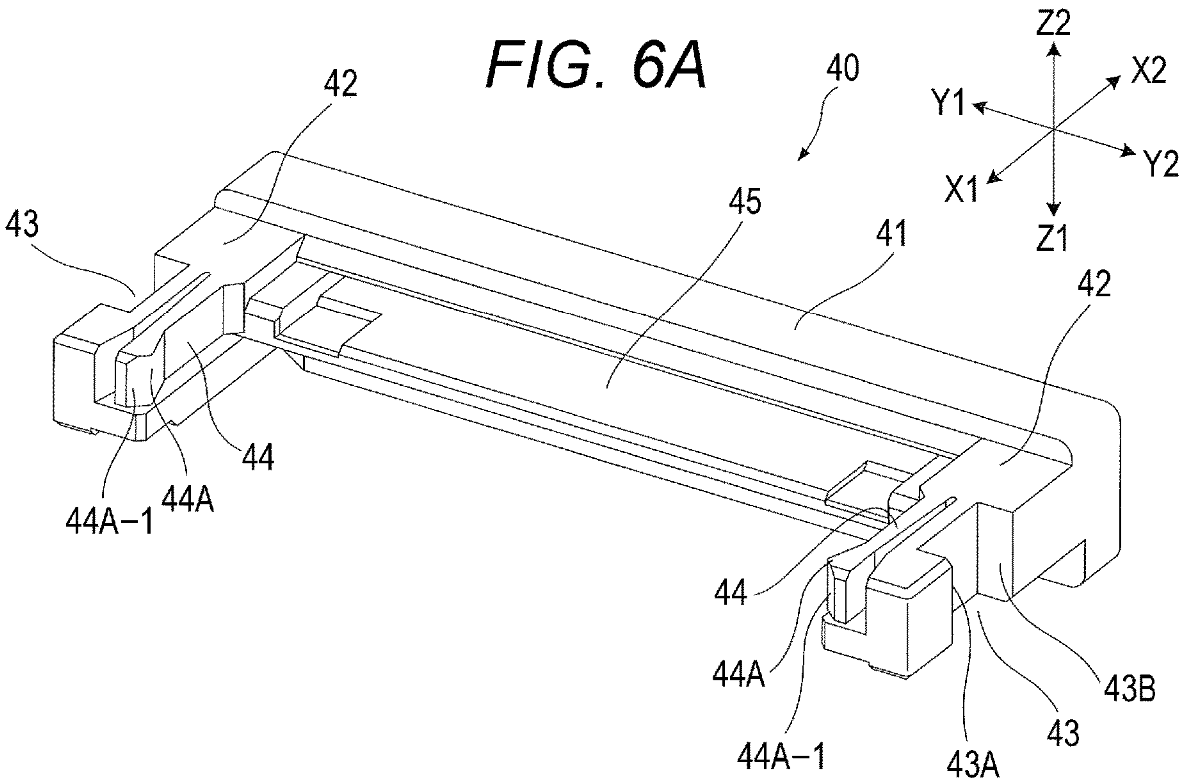
FIG. 6A is a perspective view showing the slider in FIG. 2 upside down.
Figure 6B:
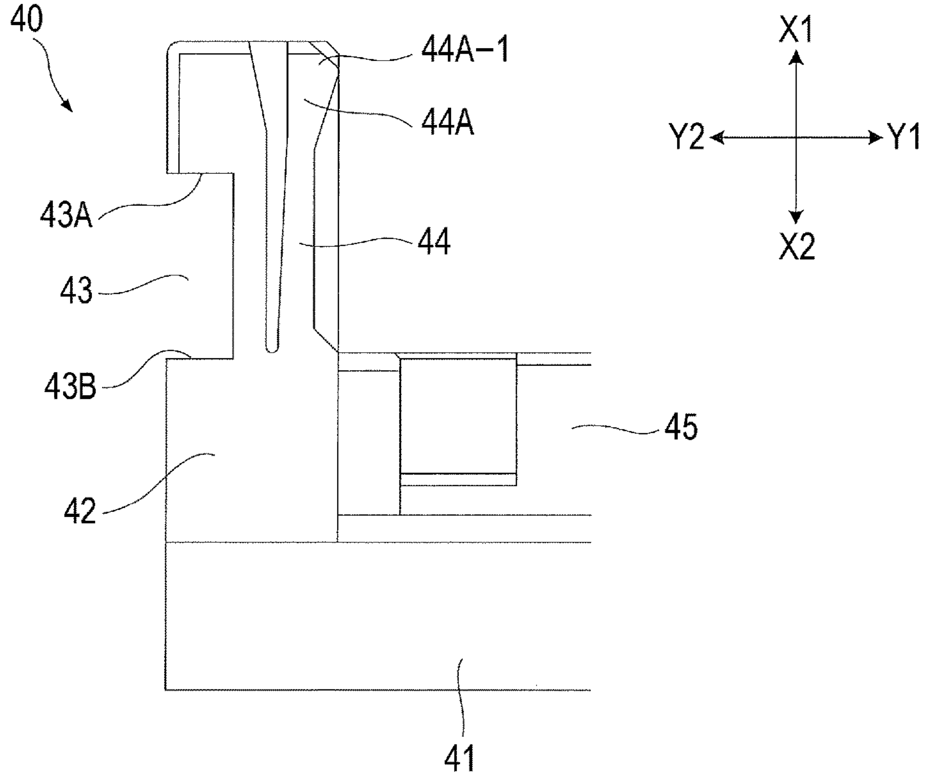
FIG. 6B is an enlarged plan view showing the end portion of the slider in FIG. 6A.

FIG. 6A is a diagram showing the slider 40 in FIG. 2 upside down. FIG. 6B is an enlarged plan view showing the end portion of the slider 40 in FIG. 6A. The slider 40 is made of an electrically insulating material such as a resin. As shown in FIG. 2, FIG. 6A, and FIG. 6B, the slider 40 has a base part 41 extending in the connector width direction, the side arm 42 extending from both end portions of the base part 41 in the connector width direction toward the front side (the X1 direction), and the pressing plate part 45 extending from the base part 41 toward the front side between the two side arms 42.

As shown in FIG. 1 and FIG. 2, the base part 41 is provided spreading in almost the same range as the housing 10 when viewed in the longitudinal direction, and in the range corresponding to the receiving part 13, an insertion hole part 41A that penetrates the base part 41 in the longitudinal direction is formed. The insertion hole part 41A forms a slit shape extending in the connector width direction in the center area of the base part 41, and permits the pass of the flat conductor C.

The side arm 42 has a cam housing part 43 that houses a cam part 53, described later, of the movable member 50. As shown in FIG. 2, FIG. 6A, and FIG. 6B, the cam housing part 43 is formed such that the cam housing part 43 is put in the outer side surface of the side arm 42 at the middle position in the longitudinal direction of the side arm 42, and penetrates the side arm 42 in the vertical direction. The cam housing part 43 receives pressing force from the cam part 53 in the longitudinal direction on the inner wall surface on the front side and rear side of the cam housing part 43. More specifically, the inner wall surface on the front side of the cam housing part 43 (a surface at a right angle to the longitudinal direction) forms a front-side pressed part 43A that receives pressing force directed from the cam part 53 toward the front side, and the inner wall surface on the rear side of the cam housing part 43 (at surface at a right angle to the longitudinal direction) forms a rear-side pressed part 43B that receives pressing force directed from the cam part 53 toward the rear side.

As shown in FIG. 2, FIG. 3A, FIG. 3B, FIG. 6A, and FIG. 6B, the upper portion of the side arm 42 (FIG. 6A and the lower portion in FIG. 6B) is provided with a locked arm 44 elastically deformable in the connector width direction. The locked arm 44 is provided on a portion on the inner side of the side arm 42 in the connector width direction, and as shown in FIG. 6A (and FIG. 6B), extends toward the front side from almost the same position as the rear-side pressed part 43B to the position of the front end of the side arm 42 in the longitudinal direction. The locked arm 44 has the locked part 44A projecting in the connector width direction at the front end portion of the locked arm 44. The locking part 16 of the housing 10 is in the longitudinal direction with the locked part 44A.

As shown in FIG. 3A, FIG. 3B, and FIG. 6B, the locked part 44A has a mountain shape in which the projecting amount is the largest in the middle of the longitudinal direction when viewed in the vertical direction. that is, the side surface of the front portion of the locked part 44A (a surface parallel to the vertical direction) is inclined to the inner side in the connector width direction as going to toward the rear side when viewed in the vertical direction. The side surface of the rear portion of the locked part 44A is inclined to the inner side as going toward the front side in the connector width direction when viewed from above.

When the slider 40 is located at the forward position, the rear portion of the locked part 44A is lockable by contacting the locking part 16 from the front side at the front side position from the locking part 16 of the housing 10. Thus, the unexpected movement of the slider 40 to the rear side is regulated (see FIG. 9B). When the slider 40 is located at the retreat position, the front portion of the locked part 44A is lockable by contacting the locking part 16 from the rear side at the rear side position from the locking part 16 of the housing 10. Thus, the unexpected movement of the slider 40 to the front side is regulated (see FIG. 3A, FIG. 3B, and FIG. 7B).

In the present embodiment, as shown in FIG. 3B, the front portion of the locked part 44A functions as a spring-biased part 44A-1 that receives biasing force directed from the spring-biasing part 16A, i.e., the rear portion of the locking part 16 to the rear side. More specifically, when the slider 40 is located at the retreat position, the locked arm 44 is elastically deformed by being pressed in the connector width direction outward by the spring-biasing part 16A. The spring-biased part 44A-1 is pressed in the connector width direction inward by the spring-biasing part 16A due to the elastic force, which is generated in the locked arm 44, directed to the connector width direction inward (the restoring force directed to the connector width direction inward). At this time, the spring-biased part 44A-1 presses the spring-biasing part 16A to the front side by the component force of the elastic force. As a result, the spring-biased part 44A-1 receives the reaction force from the spring-biasing part 16A toward the rear side, and the spring-biased part 44A-1 is spring-biased to the rear side.

In the present embodiment, the spring-biasing part 16A and the spring-biased part 44A-1 are formed as a part of the locking part 16 and a part of the locked part 44A provided to lock the housing 10 on the slider 40. Therefore, since it is unnecessary to separately provide the spring-biasing part and the spring-biased part at positions different from the locking part 16 and the locked part 44A, it is possible to avoid an increase in the size of the connector 1.

The pressing plate part 45 is located above the insertion hole part 41A of the base part 41, extends in the connector width direction, and joins the side surfaces of the rear portion of two side arms 42. The pressing plate part 45 enters between the contacting parts 25A and 26A of the terminal 20 and the pressing arm 27 from the rear side in the terminal array range in the connector width direction when the slider 40 is located at the forward position (see FIG. 10B). At this time, the pressing plate part 45 receives pressing force from the pressing arm 27 from above, presses the top surface of the flat conductor C downward, and increases the contact pressure of the flat conductor C and the contacting parts 25A and 26A to the pressing arm 27. The pressing plate part 45 faces the top surface of the flat conductor C and contacts the top surface of the flat conductor C directly above the anti-pull-out projection 12A of the housing 10 at the both end portions in the connector width direction when the slider 40 is located at the forward position, and the pressing plate part 45 regulates the movement of the flat conductor C upward.

The movable member 50 is rotatable between the open position having an attitude at a predetermined angle to the longitudinal direction (e.g. see FIG. 1) and the closed position having an attitude along the longitudinal direction (e.g. see FIG. 2 and FIG. 9A). In the present embodiment, the movable member 50 is rotated such that the movable member 50 is vertically erected at the open position in the longitudinal direction and is parallel to the longitudinal direction at the closed position. Therefore, the rotation of an angle of the movable member 50 between the open position and the closed position is about 90 degrees. The movable member 50 has an operating part 51 extending in the connector width direction, an elongated plate part 52 provided at both end portions of the movable member 50 in the connector width direction, the cam part 53, and the shaft 54. Note that the angle of the movable member 50 in the longitudinal direction at the open position is not limited to vertical angles, and the angles only have to be predetermined angles in the range expecting similar functions.

As shown in FIG. 2, the operating part 51 has, in an attitude in which the movable member 50 is at the closed position, a top plate part 51A in a plate shape having the vertical direction as the plate thickness direction, a front plate part 51B extending from the front end of the top plate part 51A downward and having the longitudinal direction as the plate thickness direction, an a side plate part 51C joined to the end portions of the top plate part 51A and the front plate part 51B having the connector width direction as the plate thickness direction in the connector width direction, the operating part 51 receives the rotating operation (opening and closing operations) in the direction of opening and closing.

As shown in FIG. 2, the elongated plate part 52 elongates from the side plate part 51C toward the rear side in the attitude in which the movable member 50 is at the closed position, and forms a plate shape as the connector width direction is the plate thickness direction. As shown in FIG. 2, the elongated plate part 52 is formed in a nearly rectangular shape at the closed position when viewed when viewed in the connector width direction. The corner part of the rear portion on the top end side is formed in an arc shape.

As shown in FIG. 2, the elongated plate part 52 is located being displaced slightly downward from the top plate part 51A of the movable member 50 at the closed position. A step part formed at a boundary position to the elongated plate part 52 in the rear end portion of the top plate part 51A forms a topped part 51A-1 supported by the motion stopper 12B of the housing 10 when the movable member 50 is located at the open position (also see FIG. 4A).

As shown in FIG. 2, the cam part 53 provided projecting from the inner side surface of the elongated plate part 52 (a surface located on the inner side in the connector width direction) in the connector width direction inward. The cam part 53 is housed in the cam housing part 43 of the slider 40 (see FIG. 4A, FIG. 8A, and FIG. 10A).

Figure 10A:
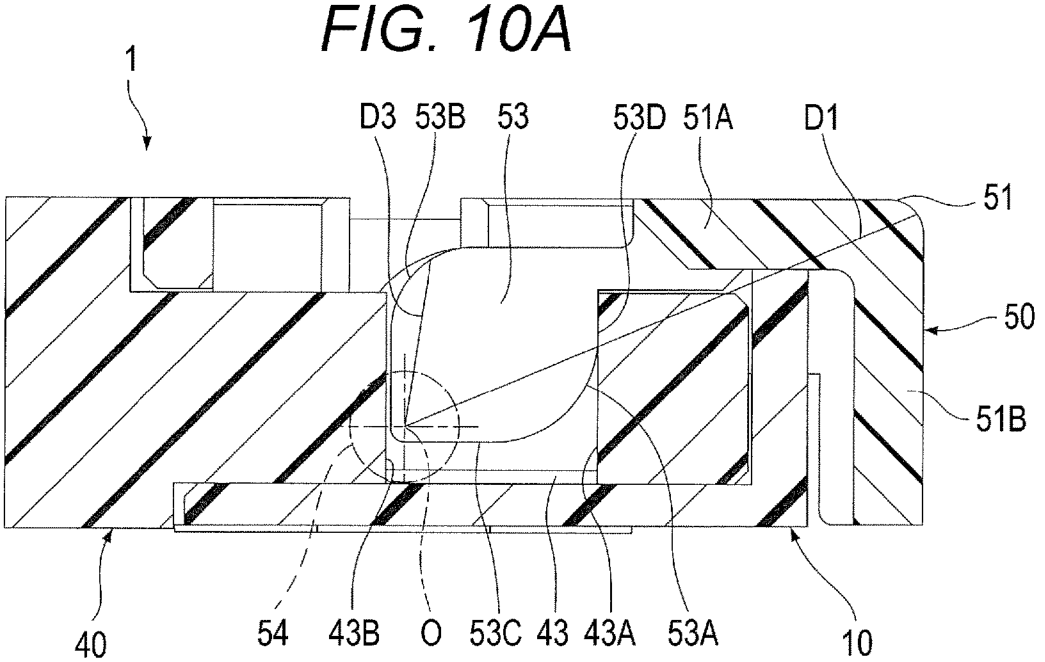
FIG. 10A is a longitudinal sectional view showing the electrical connector for flat conductor in FIG. 9A and FIG. 9B, showing a cross-section at the position of the cam part in the connector width direction.

In the following, referring to FIG. 4A showing the cam part 53 at the open position and FIG. 10A showing the cam part 53 at the closed position, the shape of the cam part 53 will be described in detail. As shown in FIG. 4A and FIG. 10A, the cam part 53 is formed in a nearly rectangular shape smaller than the elongated plate part 52 when viewed in the connector width direction. In FIG. 4A, a first corner part located on the top end side of the front portion (a corner part located on the lower end side of the front portion in FIG. 10A) has an arc shape, and in FIG. 4A, a second corner part located on the lower end side of the rear portion (a corner part located on the top end side of the rear portion in FIG. 10A) has an arc shape.

In the circumferential surface of the cam part 53 (a surface parallel to the connector width direction), a projecting curved surface formed at the first corner part forms a front-side pressing part 53A. when the movable member 50 rotates from the open position toward the closed position in the closing direction, the front-side pressing part 53A presses the front-side pressed part 43A of the slider 40 toward the front side, and moves the slider 40 to the front side. On the other hand, in the circumferential surface of the cam part 53, the projecting curved surface formed at the second corner part forms a rear-side pressing part 53B. When the movable member 50 rotates from the closed position toward the open position in the opening direction, the rear-side pressing part 53B presses the rear-side pressed part 43B of the slider 40 toward the rear side, and moves the slider 40 to the rear side.

As shown in FIG. 4A, in the circumferential surface of the cam part 53 at the open position, a flat surface that continues to the front-side pressing part 53A and forms the front-end surface of the cam part 53 (the lower-end surface at the closed position shown in FIG. 10A) forms a first contact part 53C. As shown in FIG. 4A, when the movable member 50 is located at the open position, the spring bias from the spring-biasing part 16A of the housing 10 causes the front-side pressed part 43A of the slider 40 to surface-contact and press the first contact part 53C from the front side. As shown in FIG. 10A, in the circumferential surface of the cam part 53 at the closed position, a flat surface that continues to the front-side pressing part 53A and forms the front-end surface of the cam part 53 (the top-end surface at the open position shown in FIG. 4A) forms a second contact part 53D. As shown in FIG. 10A, when the movable member 50 is at the closed position, the second contact part 53D surface-contacts the front-side pressed part 43A of the slider 40 from the rear side.

Figure 8A:
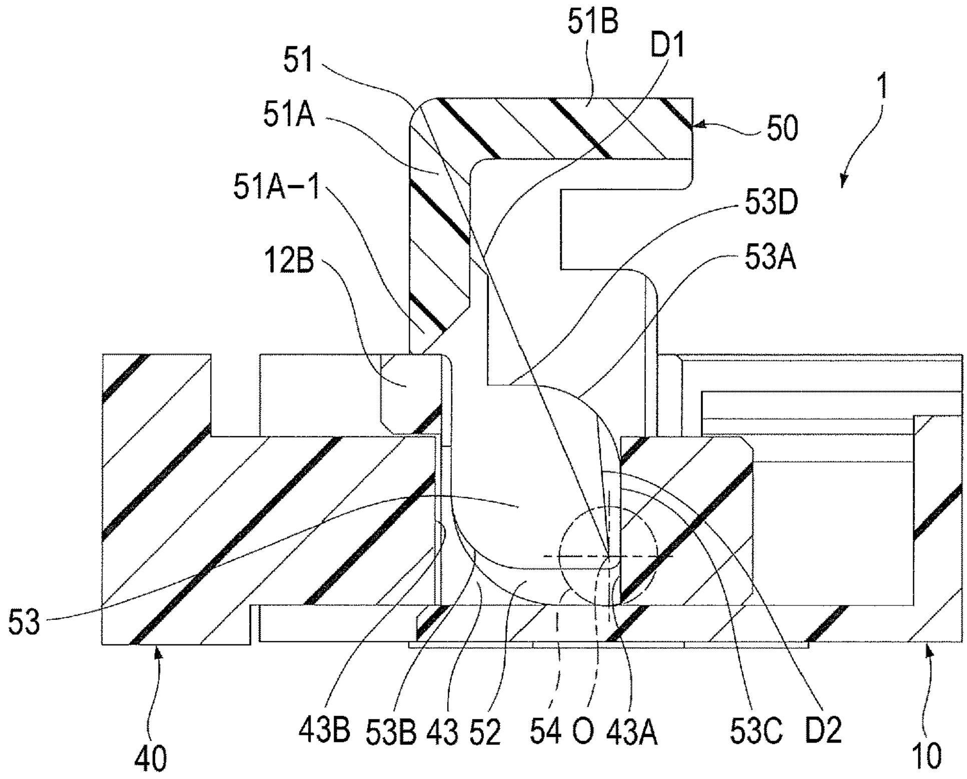
FIG. 8A is a longitudinal sectional view showing the electrical connector for flat conductor in FIG. 7A and FIG. 7B, showing a cross-section at the position of the cam part in the connector width direction.

As shown in FIG. 2, the shaft 54 is provided projecting from the outer side surface of the elongated plate part 52 (a surface located on the outer side in the connector width direction) in the connector width direction outward. The shaft 54 has a columnar shape having an axis extending in the connector width direction, and is housed in the shaft support 17D of the housing 10 as the shaft 54 is rotatable about the axis. In FIG. 4A, FIG. 8A, and FIG. 10A, the shaft 54 is depicted by a broken line. In the present embodiment, the axis of the shaft 54 matches the rotating axis of the movable member 50. In other words, the rotation center O of the movable member 50 matches the center of the shaft 54. The movement of the shaft 54 to the front side, the rear side, and the lower side is regulated by the inner wall surface of the shaft support 17D, and the movement upward is regulated by the shaft regulating part 31B of the reinforcement metal piece 30.

As shown in FIG. 4A, FIG. 8A and FIG. 10A, the shaft 54 and the rotation center O are located in the range of the cam part 53 in the longitudinal direction (X-axis direction) and in the vertical direction (in the Z-axis direction) even though the movable member 50 is at any position in the direction of opening and closing when viewed in the connector width direction. In the present embodiment, since the cam part 53 and the shaft 54 are provided at different positions in the connector width direction (Y-axis direction), the shaft 54 can be provided at a position overlapping the cam part 53 when viewed in the connector width direction. Note that the shaft 54 may be entirely located in the range of the cam part 53 when viewed in the connector width direction. As long as the rotation center O is located in the range of the cam part 53, a part of the shaft 54 that does not include the rotation center O of the movable member 50 when viewed in the connector width direction may be located outside the range of the cam part 53.

The assembly procedures of the connector 1 will be described. first, the terminal 20 is attached to the housing 10 from below. More specifically, the held part 22 of the terminal 20 is press-fit to the front housing part 15A of the housing 10 from below, and the terminal 20 is housed in the terminal housing part 15. The slider 40 is attached to the housing 10 from the rear side. More specifically, the side arm 42 of the slider 40 is inserted into the receiving end portion 13A of the housing 10 from the rear side. The mounting work of the slider 40 is performed until the slider 40 is disposed at the retreat position, i.e., the spring-biased part 44A-1 of the slider 40 contacts the spring-biasing part 16A of the housing 10 from the rear side (see FIG. 3A). Note that regarding the order of mounting the terminal 20 and the slider 40, any member may be attached first or may be attached at the same time.

Subsequently, the movable member 50 maintained in the attitude at the open position is attached to the housing 10 from above. More specifically, the cam part 53 is housed in the cam housing part 43 of the slider 40, and the shaft 54 is housed in the shaft support 17D of the housing 10. At this time, since the cam part 53 of the movable member 50 is located being contactable to the front-side pressed part 43A from the rear side in the cam housing part 43 of the slider 40, the pull-out of the slider 40 from the housing 10 to the rear side is suppressed.

Subsequently, the reinforcement metal piece 30 is attached to the housing 10 from above. More specifically, the press-fitting part 31A is press-fit to the metal piece holding part 17A-1 of the housing 10, and the held part 31 is housed in the metal piece housing part 17A of the housing 10. The reinforcement metal piece 30 is thus attached to the housing 10, and thus the shaft regulating part 31B of the reinforcement metal piece 30 is located directly above the shaft 54, and the movement of the shaft 54 upward is regulated. As a result, it is possible to excellently suppress the pull-out of the movable member 50 from the housing 10. As described above, the reinforcement metal piece 30 is attached to the housing 10, and thus the connector 1 is completed.

Next, the insertion and removal operations of the flat conductor C to the connector 1 will be described. First, prior to starting the insertion operation of the flat conductor C, the connecting part 23 of the terminal 20 and the fixing part 32 of the reinforcement metal piece 30 are solder-connected to the corresponding part of the circuit board (not shown), and the connector 1 is mounted on the circuit board. The movable member 50 is located at the open position. The further movement of the movable member 50 at the open position is stopped in the opening direction by supporting the stopped part 51A-1 the motion stopper 12B of the housing 10 from below. As already described, as shown in FIG. 4A, the spring bias from the spring-biasing part 16A of the housing 10 causes the front-side pressed part 43A of the slider 40 to surface-contact and press the first contact part 53C of the cam part 53 of the movable member 50. Therefore, the cam part 53 is supported by the slider 40 from the front side. That is, the movable member 50 is supported at two positions, i.e., the position of the stopped part 51A-1 and the position of the first contact part 53C when viewed in the connector width direction. As a result, the wobbling of the movable member 50 is suppressed, and it is possible to excellently maintain the state in which the movable member 50 is located at the open position.

Figure 7A:
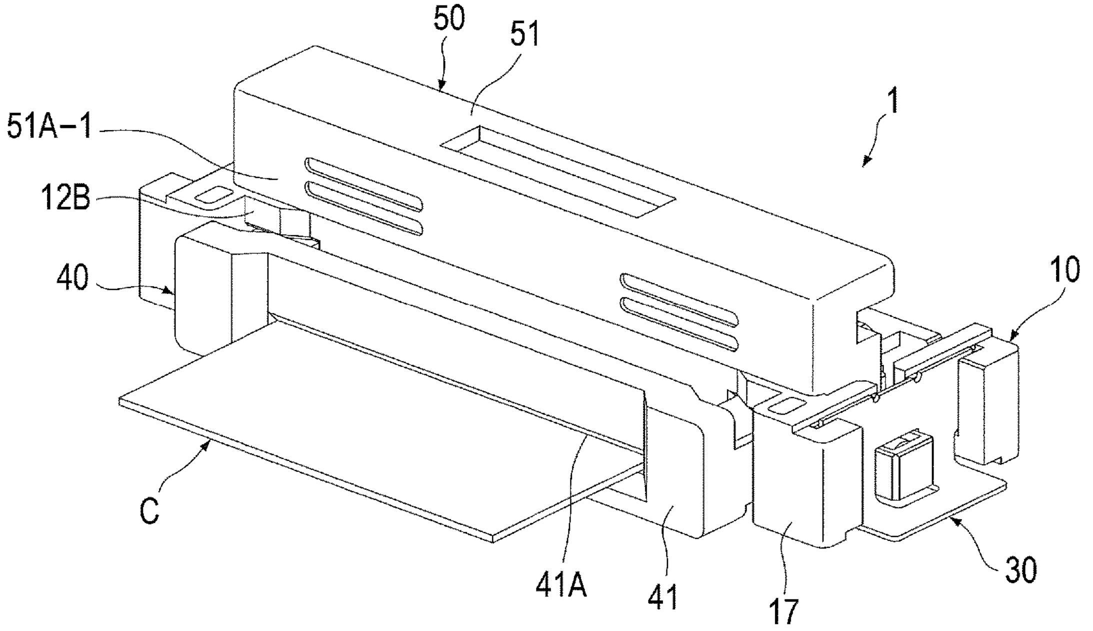
FIG. 7A is a perspective view showing the electrical connector for flat conductor immediately after the flat conductor is inserted.
Figure 7B:
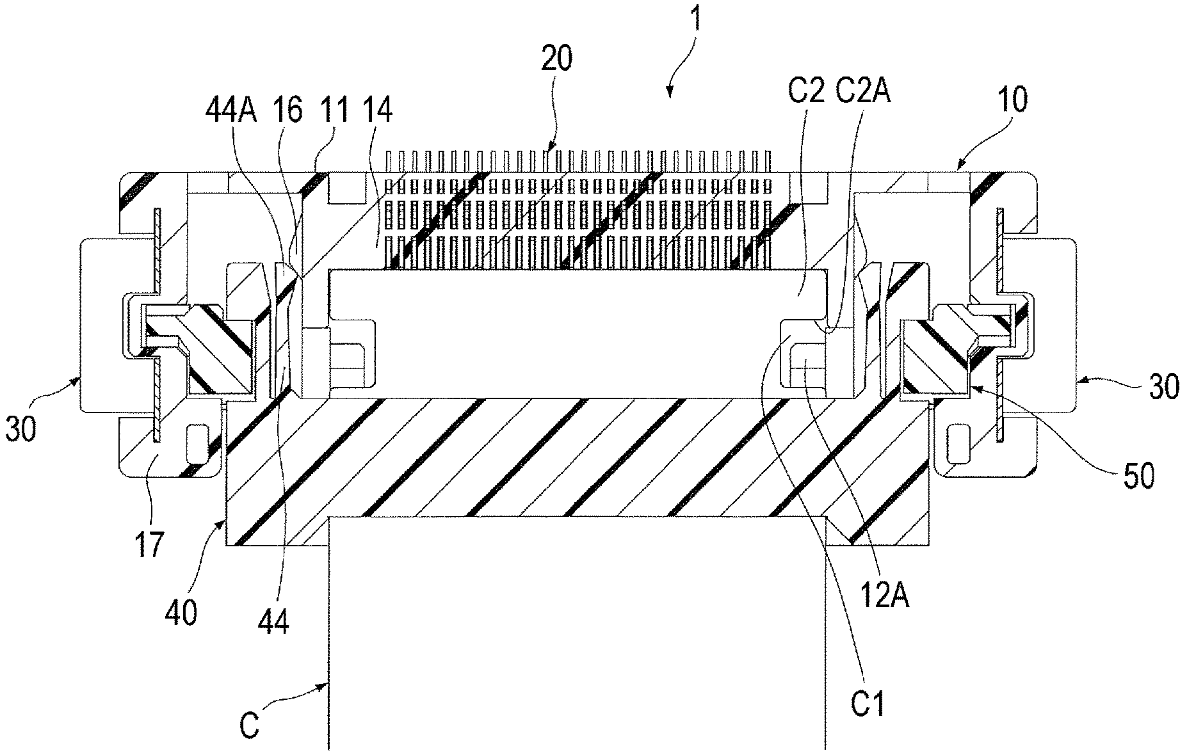
FIG. 7B is a longitudinal cross-sectional view showing the electrical connector for flat conductor immediately after the flat conductor is inserted.
Figure 8B:
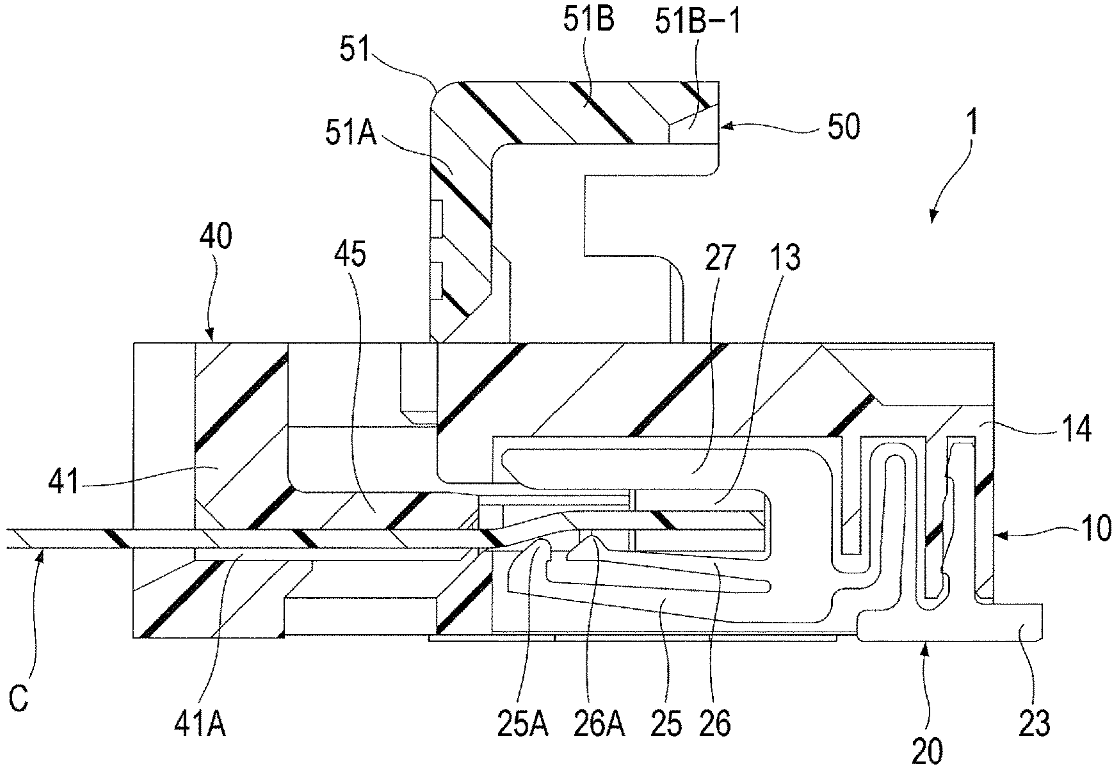
FIG. 8B is a longitudinal sectional view showing the electrical connector for flat conductor in FIG. 7A and FIG. 7B, showing a cross-section at the position of the terminal in the connector width direction.

Subsequently, as shown in FIG. 1, the front-end side portion of the flat conductor C is located on the rear side of the connector 1 with the front-end side portion of the flat conductor C extending in the longitudinal direction. Subsequently, as shown in FIG. 7A, FIG. 7B, and FIG. 8B, the front-end side portion of the flat conductor C is passed through the insertion hole part 41A of the slider 40 toward the front side, and further inserted into the receiving part 13 of the housing 10 toward the front side. As shown in FIG. 8B, in the process of the insertion into the receiving part 13, the flat conductor C enters between the contact arms 25 and 26 and the pressing arm 27 of the terminal 20. The insertion of the flat conductor C is completed at the point in time when the front end of the flat conductor C contacts the back surface of the front wall 14.

At both end portions of the flat conductor C in the connector width direction, the tab C2 is guided to the inclined plane of the anti-pull-out projection 12A of the housing 10, rides on the top-end surface, further proceeds to pass the position of the anti-pull-out projection 12A, and reaches the front side from the anti-pull-out projection 12A. As shown in FIG. 3A and FIG. 8B, the insertion of the flat conductor C is performed until the front-end surface of the flat conductor C contacts the rear end of surface of the front wall 14. As shown in FIG. 3A, at the point in time when the insertion is completed, the flat conductor C is located such that the notch C1 surrounds the anti-pull-out projection 12A when viewed from above.

As shown in FIG. 8B, at the point in time when the insertion of the flat conductor C is completed, the pressing plate part 45 of the slider 40 presses the top surface of the flat conductor C downward at the rear side position from the anti-pull-out projection 12A. Therefore, as shown in FIG. 8B, the flat conductor C is in a state in which the flat conductor C is bent in a nearly crank shape in the thickness direction.

Subsequently, the operating part 51 of the movable member 50 at the open position is caught with a finger to rotate the movable member 50 in the closing direction, and the movable member 50 is moved to the closed position. In the process of rotation in the closing direction, the front-side pressing part 53A of the movable member 50 presses the front-side pressed part 43A of the slider 40 toward the front side. More specifically, the front-side pressing part 53A presses the upper portion of the front-side pressed part 43A to the front side while sliding on the upper portion of the front-side pressed part 43A. As a result, the slider 40 moves to the front side, interlocking with the rotation of the movable member 50.

In the process of rotation of the movable member 50, i.e., in the process of movement of the slider 40 to the front side, when the spring-biased part 44A-1 of the locked arm 44 (the front portion of the locked part 44A) contacts the spring-biasing part 16A of the housing 10 (the rear portion of the locking part 16) from the rear side, the spring-biased part 44A-1 receives pressing force in the connector width direction outward. As a result, the locked arm 44 is elastically deformed in the connector width direction outward, and the further movement of the slider 40 to the front side is permitted. when the movable member 50 reaches the closed position, the slider 40 reaches the forward position. At this time, the locked part 44A rides over the locking part 16, and the locked arm 44 is deformed in the connector width direction inward such that the amount of elastic deformation is reduced. As a result, the locked part 44A is in a state in which the locked part 44A is lockable to the locking part 16 from the front side (see FIG. 9B), and thus the unexpected movement of the slider 40 to the rear side is stopped.

Figure 10B:
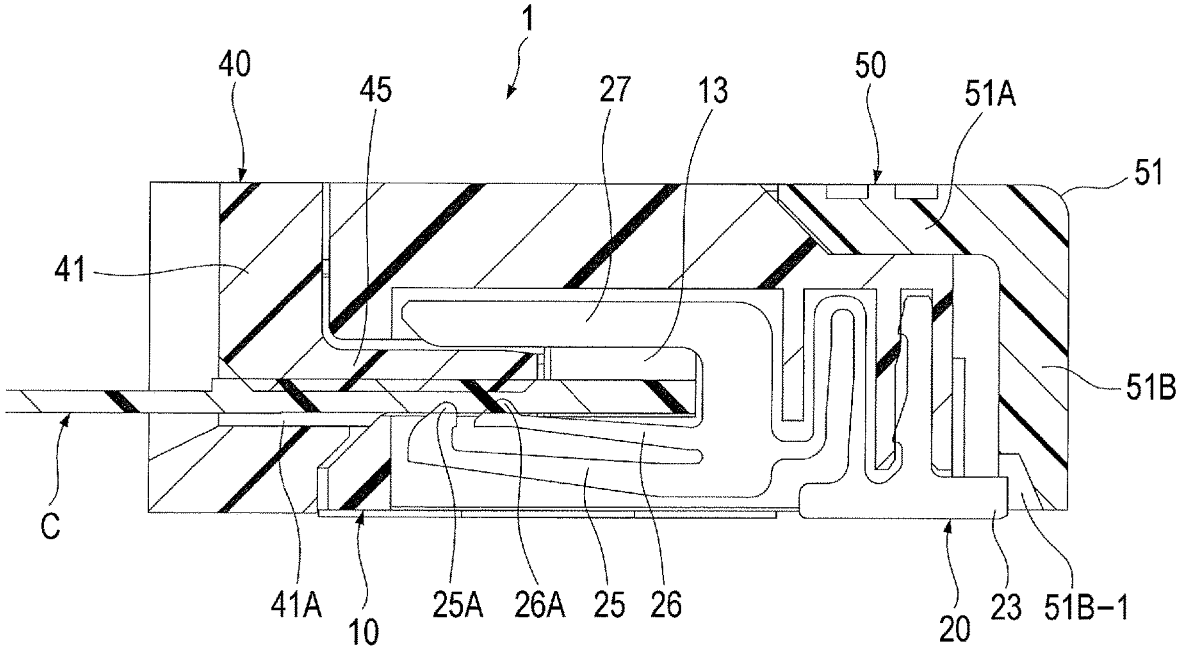
FIG. 10B is a longitudinal sectional view showing the electrical connector for flat conductor in FIG. 9A and FIG. 9B, showing a cross-section at the position of the terminal in the connector width direction.

As shown in FIG. 10A, when the movable member 50 reaches the closed position, the second contact part 53D of the cam part 53 surface-contacts the front-side pressed part 43A of the slider 40, and the cam part 53 is supported by the front-side pressed part 43A. As shown in FIG. 10A (and FIG. 10B), when the movable member 50 reaches the closed position, the top plate part 51A of the movable member 50 surface-contacts the top surface of the front wall 14 of the housing 10 from above, and the further movement of the movable member 50 in the closing direction is stopped. The front plate part 51B of the movable member 50 faces and is located at the front surface of the front wall 14 of the housing 10 from the front side. As shown in FIG. 10B, the lower end of the front plate part 51B is located at almost the same height of the lower end of the housing 10, and covers the connecting part 23 of the terminal 20. Therefore, the connecting part 23 is externally protected, and for example, the attachment of dust particles to the connecting part 23, the contact of the fingers of operators, and so on are excellently suppressed. In the present embodiment, as shown in FIG. 10B, the lower end of the front plate part 51B is formed with a notch 51B-1 at the corresponding position to the connecting part 23, and the interference of the connecting part 23 with the front plate part 51B is avoided.

When the slider 40 reaches the forward position, both end portions of the pressing plate part 45 in the connector width direction are located directly above the anti-pull-out projection 12A. The pressing plate part 45 contacts the top surface of the flat conductor C at this position and regulates the movement of the flat conductor C upward, and the catch C2A of the flat conductor C is maintained at the position lockable to the anti-pull-out projection 12A. Therefore, the unnecessary pull-out of the flat conductor C is stopped.

As shown in FIG. 10B, in the terminal array range in the connector width direction, the pressing plate part 45 of the slider 40 enters between the pressing arm 27 of the terminal 20 and the flat conductor C, and receives pressing force from the pressing arm 27 downward. This pressing force is transmitted to the flat conductor C through the pressing plate part 45, the flat conductor C presses the contacting parts 25A and 26A, and the contact arms 25 and 26 are elastically displaced downward. As a result, the contacting parts 25A and 26A contact the circuit part of the flat conductor C from below with a contact pressure. The pressing plate part 45 and the flat conductor C are clamped by the pressing arm 27 and the contact arms 25 and 26. Also in this terminal array range, the pressing plate part 45 contacts the top surface of the flat conductor C, and the movement of the flat conductor C upward is regulated. Note that in FIG. 10B, the contact arms 25 and 26 are shown in the state in which the contact arms 25 and 26 are not elastically displaced. Actually, the contact arms 25 and 26 are elastically displaced downward.

As described above, in the present embodiment, the pressing arm 27 is provided on the terminal 20, and thus the flat conductor C is indirectly clamped by the pressing arm 27 and the contact arms 25 and 26, and the contact pressure of the contacting parts 25A and 26A with the circuit part of the flat conductor C is increased. Therefore, when the connector 1 is used, even though the connector 1 receives external vibrations and the elastic part 28 and the contact arms 25 and 26 are elastically displaced as following the vibrations, the state in which the flat conductor C is clamped is maintained. As a result, it is possible to excellently maintain the state in which the contacting parts 25A and 26A and the circuit part of the flat conductor C contact each other with a contact pressure. The movable member 50 is thus rotated to the closed position, and the insertion and connection operation of the flat conductor C to the connector 1 is completed.

In the present embodiment, the rotation center O of the movable member 50 is located in the range of the cam part 53 in the longitudinal direction when viewed in the connector width direction (the lateral direction) even though the movable member 50 is located at any position in the direction of opening and closing. Therefore, the rotation center O and the front-side pressing part 53A are located close, and the distance between the rotation center O and the front-side pressing part 53A is reduced correspondingly. Therefore, as shown in FIG. 8A, a ratio of a distance D1 between the outer surface of the operating part 51 (the surface that the operator taches with the fingers for operation) and the rotation center O to a distance D2 between the rotation center O and the front-side pressing part 53A is reduced, and thus it is possible to reduce the operating force necessary to rotate the movable member 50 in the closing direction correspondingly. Note that the distance D1 is a distance between a given position on the outer surface of the operating part 51 and the rotation center O, and FIG. 8A shows an example. The distance D2 is a distance between a given position of the front-side pressing part 53A and the rotation center O, and FIG. 8A shows an example.

Next, the operation of the pull-out of the flat conductor C from the connector 1 will be described. In the case in which the flat conductor C inserted and connected to the connector 1 is pulled-out, the operating part 51 of the movable member 50 at the closed position is caught with a finger to rotate the movable member 50 in the opening direction, and the movable member 50 is moved to the open position. In the process of rotation in the opening direction, the rear-side pressing part 53B of the movable member 50 presses the rear-side pressed part 43B of the slider 40 toward the rear side. More specifically, the rear-side pressing part 53B presses the upper portion of the rear-side pressed part 43B to the rear side while sliding on the upper portion of the rear-side pressed part 43B. As a result, the slider 40 moves to the rear side, interlocking with the rotation of the movable member 50.

In the process of rotation of the movable member 50, i.e., in the process of movement of the slider 40 to the rear side, the locked part 44A rides over the locking part 16 in association with the elastic deformation of the locked arm 44 in the connector width direction outward. when the movable member 50 reaches the open position, the slider 40 reaches the retreat position. At the retreat position, the spring-biased part 44A-1 is spring-biased to the rear side by the spring-biasing part 16A (see FIG. 3B), and as shown in FIG. 8A, the front-side pressed part 43A contacts and is pressed to the first contact part 53C of the cam part 53 from the front side. The stopped part 51A-1 of the movable member 50 contacts the motion stopper 12B of the housing 10 from above. As a result, the movable member 50 is supported by the first contact part 53C and the stopped part 51A-1, and maintained at the open position.

As described above, after the movable member 50 is moved to the open position, the flat conductor C is just pulled to the rear side, and it is possible to simply pull out the flat conductor C of the connector 1. At this time, since the pressing plate part 45 is located on the rear side from the anti-pull-out projection 12A, the pressing plate part 45 hardly interferes with the top surface of the flat conductor C when the flat conductor C is pulled out, and the flat conductor C is easily pulled out.

In the present embodiment, the rotation center O of the movable member 50 is located in the range of the cam part 53 in the longitudinal direction when viewed in the connector width direction (the lateral direction) even though the movable member 50 is located at any position in the direction of opening and closing. Therefore, the rotation center O and the rear-side pressing part 53B are located close to each other, and the distance between the rotation center O and the rear-side pressing part 53B is reduced. Therefore, as shown in FIG. 10A, a ratio of a distance D3 between the rotation center O and the rear-side pressing part 53B to the distance D1 between the outer surface of the operating part 51 and the rotation center O is reduced. Thus, it is possible to reduce the operating force necessary to rotate the movable member 50 in the opening direction. Note that the distance D1 is the distance between a given position on the outer surface of the operating part 51 and the rotation center O, and FIG. 10A shows an example. The distance D3 is a distance between a given position of the rear-side pressing part 53B and the rotation center O, and FIG. 10A shows an example.

In the present embodiment, the inclined plane is formed at a portion contactable to the counterpart in both of the spring-biasing part 16A of the housing 10 and the spring-biased part 44A-1 of the slider 40. however, it is unnecessary to form an inclined plane on both of the spring-biasing part 16A and the spring-biased part 44A-1, and the component force in the longitudinal direction only has to be produced by the elastic force in the connector width direction. As an exemplary modification, for example, an inclined plane may be formed on any one of the spring-biasing part 16A and the spring-biased part 44A-1. In the present embodiment, in the spring-biasing part 16A and the spring-biased part 44A-1, the surface of the portion contactable to the counterpart is an inclined plane. however, a flat surface is unnecessary, and a surface only has to have a component inclined in the longitudinal direction. for example, the surface may be formed as a projecting curved surface.

In the present embodiment, the slider 40 is provided with the locked arm 44 elastically deformable in the connector width direction, and the spring-biased part 44A-1 of the locked arm 44 is spring-biased to the rear side by the spring-biasing part 16A of the housing 10 using the elastic force of the locked arm 44. however, it is unnecessary to provide an elastically deformable par on the slider 40. As an exemplary modification, for example, an elastically deformable part may be provided on the housing 10, and the spring-biased part 44A-1 of the slider 40 may be spring-biased to the rear side by the spring-biasing part formed at that part spring-biases. As another exemplary modification, the elastically deformable part may be provided on both of the housing 10 and the slider 40, and the spring-biasing part and the spring-biased part may be provided on these parts.

It is unnecessary that the direction of elastic deformation of the elastically deformable part be the connector width direction. for example, the direction of elastic deformation may be the vertical direction or the longitudinal direction. In the case in which the direction of elastic deformation is the vertical direction, in at least one of the spring-biasing part and the spring-biased part, the surface of the part contactable to the counterpart is formed as a surface having a component inclined to the longitudinal direction when viewed in the connector width direction (e.g. a flat inclined plane, a projecting curved surface, and so on). In the case in which the direction of elastic deformation is the longitudinal direction, the entire elastic force, or the reaction force to the entire elastic force is used for spring-biasing, not the component force of the elastic force. In this case, it is unnecessary to provide an inclined plane at a part contacting each other on the spring-biasing part and the spring-biased part.

In the present embodiment, the movable member 50 moves between the open position and the closed position only by rotating about the rotation center O. Instead of this, for example, another movement may be performed along with rotation. for example, a sliding movement may be performed in the longitudinal direction along with the rotation of the movable member 50.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electrical connector for flat conductor comprising:

a housing, a plurality of terminals, a slider, and a movable member, wherein the housing is capable of inserting and pulling out a flat conductor in a longitudinal direction, the plurality of terminals is in an array in a lateral direction, and the plurality of terminals is held in the housing, the slider is attached to the housing such that the slider is movable in the longitudinal direction between a retreat position at which pull-out of the flat conductor is permitted and a forward position located on a front side from the retreat position, the forward position at which pull-out of the flat conductor is stopped, the movable member is attached to the housing such that the movable member is rotatable about an axis extending in the lateral direction between an open position forming an attitude having a predetermined angle to the longitudinal direction and a closed position forming an attitude along the longitudinal direction, the movable member has a cam part, and the cam part has a front-side pressing part and a rear-side pressing part, the front-side pressing part presses the slider toward a front side when the movable member rotates in a closing direction going to the closed position, the rear-side pressing part presses the slider to a rear side when the movable member rotates in an opening direction going to the open position, and a rotation center of the movable member is located in a range of the cam part in the longitudinal direction when viewed in the lateral direction.

2. The electrical connector for flat conductor according to claim 1, further comprising a metal piece, wherein the metal piece is held in the housing, and the metal piece has a shaft regulating part, the movable member further has a shaft, the housing further has a shaft support, the shaft is provided such that the shaft includes the rotation center at a position corresponding to the metal piece in the lateral direction when viewed in the lateral direction, the shaft support houses the shaft, and the shaft support regulates movement of the shaft to a front side, a rear side, and a lower side, and the shaft regulating part is located above the shaft, and the shaft regulating part regulates movement of the shaft to an upper side.

3. The electrical connector for flat conductor according to claim 2, wherein the metal piece further has a held part and a fixing part, the held part is attached to the housing from above, and the fixing part is formed across a range including the shaft in the longitudinal direction, and the fixing part is fixed to a circuit board with solder.

4. The electrical connector for flat conductor according to claim 1, wherein the housing further has a motion stopper and a spring-biasing part, when the movable member is at the open position, the motion stopper contacts the movable member to stop movement of the movable member in the opening direction, and when the movable member is at the open position, the spring-biasing part spring-biases the slider at the retreat position toward the rear side, and presses the slider to the cam part from the front side.

5. The electrical connector for flat conductor according to claim 4, wherein the housing further has a locking part, the slider further has a locked part, a locked arm, and a spring-biased part, the locking part is lockable to the locked part of the slider at the forward position from the rear side, the locked arm extends toward the front side, and the locked arm is elastically deformable, the locked part is formed on the locked arm, at least one of a rear portion of the locking part and a front portion of the locked part includes a surface having a component in a direction inclined to the longitudinal direction, the spring-biasing part is formed on the rear portion of the locking part, the spring-biased part is formed on the front portion of the locked part, and the spring-biasing part contacts the spring-biased part of the slider at the retreat position, and the spring-biasing part spring-biases the spring-biased part toward the rear side.

* * * * *